US006535226B1

United States Patent
Sorokin et al.

(10) Patent No.: US 6,535,226 B1
(45) Date of Patent: Mar. 18, 2003

(54) NAVIGABLE TELEPRESENCE METHOD AND SYSTEM UTILIZING AN ARRAY OF CAMERAS

(75) Inventors: Scott Sorokin, New York, NY (US); David C. Worley, Weston, CT (US); Andrew H. Weber, New York, NY (US)

(73) Assignee: Kewazinga Corp., Westport, CT (US)

( * ) Notice: Subject to any disclaimer, the term of this patent is extended or adjusted under 35 U.S.C. 154(b) by 0 days.

(21) Appl. No.: 09/283,413

(22) Filed: Apr. 1, 1999

Related U.S. Application Data

(60) Provisional application No. 60/080,413, filed on Apr. 2, 1998.

(51) Int. Cl.[7] .................................................. G09G 5/00
(52) U.S. Cl. ........................ 345/723; 345/427; 345/740
(58) Field of Search ................................. 345/744, 716, 345/427, 848, 850, 419, 726; 348/159, 218, 716, 719, 518, 36–39; 386/118, 119; 382/154; 600/111

(56) References Cited

U.S. PATENT DOCUMENTS

| 4,355,328 A | 10/1982 | Kulik | 348/38 |
| 4,463,380 A | 7/1984 | Hooks, Jr. | 348/580 |
| 4,847,700 A | 7/1989 | Freeman | 386/99 |

(List continued on next page.)

FOREIGN PATENT DOCUMENTS

WO        WO 97/03416        1/1997

OTHER PUBLICATIONS

Shenchang Eric Chen, QuickTime VR– An Image–Based Approach to Virtual Environment Navigation, Apple Computer, Inc. pp. 1–10, Sep. 1995.*
Kelly et al., "An Architecture for Multiple Perspective Interactive Video," pp., 1–20, 1995.*
Jasnoch et al., "Shared 3D Environment within a Virtual Prototyping Environment," pp. 274–279, 1996.*

(List continued on next page.)

Primary Examiner—John Cabeca
Assistant Examiner—Tadesse Hailu
(74) Attorney, Agent, or Firm—Strook & Strook & Lavan LLP

(57) ABSTRACT

A telepresence method and system for providing users the ability to navigate through an array of cameras capturing an environment. The array of cameras includes one or more series of cameras, wherein each series of cameras defines a path through the environment and wherein the cameras in each series have a progressively different perspective of the environment. Users interactively navigate through series of cameras, thereby simulating movement along paths.

119 Claims, 11 Drawing Sheets

U.S. PATENT DOCUMENTS

| | | | | |
|---|---|---|---|---|
| 5,023,725 | A | | 6/1991 | McCutchen .................. 348/38 |
| 5,067,014 | A | | 11/1991 | Bergen et al. .............. 382/107 |
| 5,130,794 | A | | 7/1992 | Ritchey ........................ 348/39 |
| 5,185,808 | A | | 2/1993 | Cok ............................. 348/39 |
| 5,187,571 | A | | 2/1993 | Braun et al. ................ 382/107 |
| 5,253,168 | A | * | 10/1993 | Berg ........................... 600/301 |
| 5,257,349 | A | | 10/1993 | Alexander .................. 123/399 |
| 5,259,040 | A | | 11/1993 | Hanna ........................ 382/107 |
| 5,465,729 | A | * | 11/1995 | Bittman et al. ............. 600/545 |
| 5,488,674 | A | | 1/1996 | Burt et al. ................... 382/284 |
| 5,495,576 | A | | 2/1996 | Ritchey ...................... 345/420 |
| 5,497,188 | A | | 3/1996 | Kaye ........................... 348/36 |
| 5,562,572 | A | | 10/1996 | Carmein ........................ 482/4 |
| 5,566,251 | A | | 10/1996 | Hanna et al. ............... 382/284 |
| 5,581,629 | A | | 12/1996 | Hanna et al. ............... 348/103 |
| 5,585,858 | A | | 12/1996 | Harper et al. .............. 348/485 |
| 5,598,208 | A | | 1/1997 | McClintock ................ 348/159 |
| 5,600,368 | A | | 2/1997 | Matthews, III ............. 348/143 |
| 5,604,529 | A | | 2/1997 | Kuga et al. ................... 348/46 |
| 5,616,912 | A | | 4/1997 | Robinson et al. ........ 250/201.1 |
| 5,629,988 | A | | 5/1997 | Burt et al. ................... 382/276 |
| 5,632,007 | A | | 5/1997 | Freeman ....................... 706/59 |
| 5,644,694 | A | * | 7/1997 | Appleton .................... 345/474 |
| 5,649,032 | A | | 7/1997 | Burt et al. ................... 382/284 |
| 5,659,323 | A | | 8/1997 | Taylor ........................ 348/159 |
| 5,682,196 | A | | 10/1997 | Freeman ..................... 725/139 |
| 5,686,957 | A | | 11/1997 | Baker ........................... 348/36 |
| 5,703,961 | A | | 12/1997 | Rogina et al. .............. 382/154 |
| 5,706,416 | A | | 1/1998 | Mann et al. ................ 345/427 |
| 5,708,469 | A | | 1/1998 | Herzberg ...................... 348/39 |
| 5,724,091 | A | | 3/1998 | Freeman et al. ............ 725/138 |
| 5,729,471 | A | | 3/1998 | Jain et al. ................... 725/131 |
| 5,745,305 | A | | 4/1998 | Nalwa ........................ 359/725 |
| 5,850,352 | A | | 12/1998 | Moezzi et al. .............. 345/419 |
| 5,900,849 | A | * | 5/1999 | Gallery ........................... 345/8 |
| 5,963,664 | A | | 10/1999 | Kumer et al. ............... 382/154 |
| 5,999,641 | A | | 12/1999 | Miller et al. ................ 382/154 |
| 6,020,931 | A | | 2/2000 | Bilbrey et al. .............. 348/584 |
| 6,084,979 | A | | 6/2000 | Kanade et al. .............. 382/154 |
| 6,151,009 | A | | 11/2000 | Kanade et al. .............. 345/641 |
| 6,154,251 | A | | 11/2000 | Taylor ........................ 348/159 |
| 6,208,379 | B1 | * | 3/2001 | Oya et al. ................... 348/213 |
| 6,384,820 | B2 | * | 5/2002 | Light et al. ................. 345/419 |

OTHER PUBLICATIONS

Leigh et al., "Multi-perspective Collaborative Design in Persistent Networked Virtual Environments," pp. 1–13, 1996.*

Kumar, R., et al., "Detecting Lesions In Magnetic Resonance Breast Scans," SPIE, Oct. 1995.

Ackerman, R., "New Display Advances Brighten Situational Awareness Picture," Signal Magazine, Aug. 1998 [Joint Operations Visualization Environment (JOVE)].

Be Here/360 degrss immersive video, http://www.behere.com/PanImageCreationV/index.html.

BeHere, http://www.behere.com/Products/lenssystem.html.

BeHere, http://www.behere.com/NewsPress/fnews001.html.

Carnegie Mellon University Virtualized Reality, http://www.cs.cmu.edu/af/cs/project/VirtualizedR/www/explain.html.

Carnegie Mellon University, http://www.cs.cmu.edu/afs/cs/project/VirtualizedR/www/main.html.

Carnegie Mellon University, http://www.cs.cmu.edu/afs/cs/project/VirtualizedR/www/3manball_new.html.

FullView Technologies, http://www.fullview.com/about.html.

FullView Technologies, http://www.fullview.com/technology.html.

FullView Technologies, http://fullview.com/gallery.html.

Hipbone, http://www.hipbone.com/solutions/.

iMove/Infinite Pictures Inc./SmoothMove, http://www.smoothmove.com.

iMove, http://www.smoothmove.com/imovebeta/partners/index.html.

iMove, http://smoothmove.com/imovebeta/partners/index.html.

IPIX/Interactive Pictures Corp., http://www.ipix.com.

IPIX, http://ipix.com/products/fmproducts.html.

Multicam Clips, http://www.reelefx.com/Multicam/Mmain.htm.

Multicam/Index, http://www.reelefx.com/Multicam/Mtechnical/htm.

PAWS-at-a-glance, http://www.hitpaws.com/glance.html.

PAWS, http://www.hitpaws.com/company.html.

PAWS, http://www.hitpaws.com/faq.html.

Perceptual Robotics Inc., http://www.perceptualrobotics.com/about/.

Perceptual Robotics Inc., http://www.perceptualrobotics.com/products/.

Polycamera, http://www.cs.columbia.edu/CAVE/research/demos.

Snell&Wilcox, http://www.snell.co.uk/internet/aboutus/indexd.html.

Snell & Wilcom Matrix press release/Jun. 1999, http://www.snell.co.uk/internet/press/indexd.html.

Stanford University, Light field rendering http://graphics.stanford.edu/projects/lightfield/.

Timetrack, virtual camera movement, http://www.virtualcamera.com/invention.html.

Timetrack, http://www.virtualcamera.com/cameras.html.

Zaxel, 3D Replay, 2001.

Zaxel, Virtual Viewpoint–Remote Collaboration, 2001.

Zaxel, Virtual Viewpoint–Sports and Entertainment, 2001.

Shenchang Eric Chen and Lance Williams, "View Interpolation for Image Synthesis," Apple Computer, Inc., pp. 1–7, Sep. 1993.

* cited by examiner

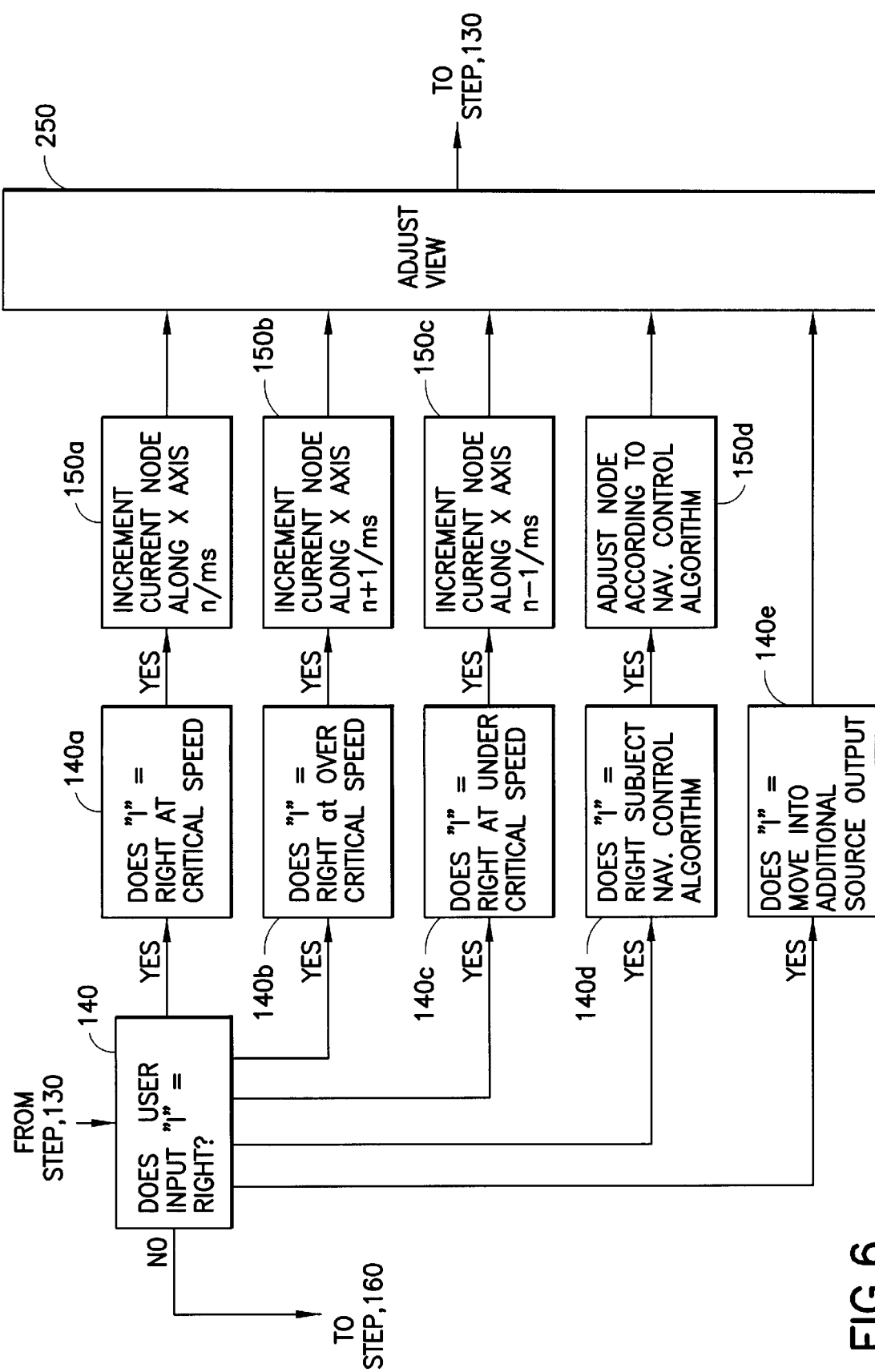

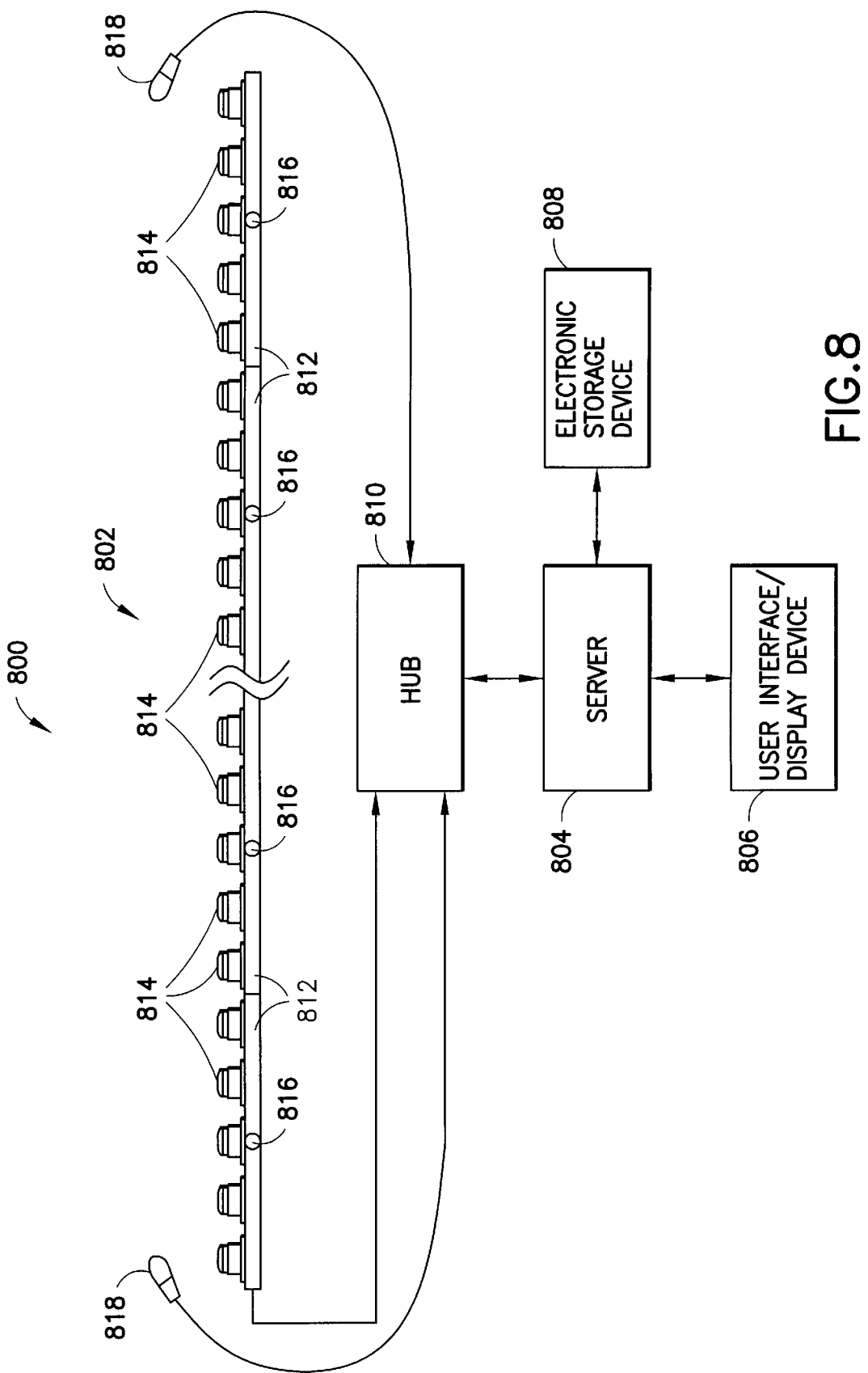

NAVIGABLE TELEPRESENCE METHOD AND SYSTEM UTILIZING AN ARRAY OF CAMERAS

CROSS-REFERENCE TO RELATED APPLICATIONS

This U.S. Non-Provisional Application claims the benefit of U.S. Provisional Application Serial No. 60/080,413, filed on Apr. 2, 1998, herein incorporated by reference.

BACKGROUND OF THE INVENTION

1. Field of the Invention

The present invention relates to a telepresence system and, more particularly, to a navigable camera array telepresence system and method of using same.

2. Description of Related Art

In general, a need exists for the development of telepresence systems suitable for use with static venues, such as museums, and dynamic venues or events, such as a music concerts. The viewing of such venues is limited by time, geographical location, and the viewer capacity of the venue. For example, potential visitors to a museum may be prevented from viewing an exhibit due to the limited hours the museum is open. Similarly, music concert producers must turn back fans due to the limited seating of an arena. In short, limited access to venues reduces the revenue generated.

In an attempt to increase the revenue stream from both static and dynamic venues, such venues have been recorded for broadcast or distribution. In some instances, dynamic venues are also broadcast live. While such broadcasting increases access to the venues, it involves considerable production effort. Typically, recorded broadcasts must be cut and edited, as views from multiple cameras are pieced together. These editorial and production efforts are costly.

In some instances, the broadcast resulting from these editorial and production efforts provides viewers with limited enjoyment. Specifically, the broadcast is typically based on filming the venue from a finite number of predetermined cameras. Thus, the broadcast contains limited viewing angles and perspectives of the venue. Moreover, the viewing angles and perspectives presented in the broadcast are those selected by a producer or director during the editorial and production process; there is no viewer autonomy. Furthermore, although the broadcast is often recorded for multiple viewings, the broadcast has limited content life because each viewing is identical to the first. Because each showing looks and sounds the same, viewers rarely come back for multiple viewings.

A viewer fortunate enough to attend a venue in person will encounter many of the same problems. For example, a museum-goer must remain behind the barricades, viewing exhibits from limited angles and perspectives. Similarly, concert-goers are often restricted to a particular seat or section in an arena. Even if a viewer were allowed free access to the entire arena to videotape the venue, such a recording would also have limited content life because each viewing would be the same as the first. Therefore, a need exists for a telepresence system that preferably provides user autonomy while resulting in recordings with enhanced content life at a reduced production cost.

Apparently, attempts have been made to develop telepresence systems to satisfy some of the foregoing needs. One telepresence system is described in U.S. Pat. No. 5,708,469 for Multiple View Telepresence Camera Systems Using A Wire Cage Which Surrounds A Polarity Of Multiple Cameras And Identifies The Fields Of View, issued Jan. 13, 1998. The system disclosed therein includes a plurality of cameras, wherein each camera has a field of view that is space-contiguous with and at a right angle to at least one other camera. In other words, it is preferable that the camera fields of view do not overlap each other. A user interface allows the user to jump between views. In order for the user's view to move through the venue or environment, a moving vehicle carries the cameras.

This system, however, has several drawbacks. For example, in order for a viewer's perspective to move through the venue, the moving vehicle must be actuated and controlled. In this regard, operation of the system is complicated. Furthermore, because the camera views are contiguous, typically at right angles, changing camera views results in a discontinuous image.

Other attempts at providing a telepresence system have taken the form of a 360 degree camera systems. One such system is described in U.S. Pat. No. 5,745,305 for Panoramic Viewing Apparatus, issued Apr. 28 1998. The system described therein provides a 360 degree view of environment by arranging multiple cameras around a pyramid shaped reflective element. Each camera, all of which share a common virtual optical center, receives an image from a different side of the reflective pyramid. Other types of 360 degree camera systems employ a parabolic lens or a rotating camera.

Such 360 degree camera systems also suffer from drawbacks. In particular, such systems limit the user's view to 360 degrees from a given point perspective. In other words, 360 degree camera systems provide the user with a panoramic view from a single location. Only if the camera system was mounted on a moving vehicle could the user experience simulated movement through an environment.

U.S. Pat. No. 5,187,571 for Television System For Displaying Multiple Views of A Remote Location issued Feb. 16, 1993, describes a camera system similar to the 360 degree camera systems described above. The system described provides a user to select an arbitrary and continuously variable section of an aggregate field of view. Multiple cameras are aligned so that each camera's field of view merges contiguously with those of adjacent cameras thereby creating the aggregate field of view. The aggregate field of view may expand to cover 360 degrees. In order to create the aggregate field of view, the cameras' views must be contiguous. In order for the camera views to be contiguous, the cameras have to share a common point perspective, or vertex. Thus, like the previously described 360 degree camera systems, the system of U.S. Pat. No. 5,187,571 limits a user's view to a single point perspective, rather than allowing a user to experience movement in perspective through an environment.

Also, with regard to the system of U.S. Pat. No. 5,187,571, in order to achieve the contiguity between camera views, a relatively complex arrangement of mirrors is required. Additionally, each camera seemingly must also be placed in the same vertical plane.

Thus, a need still exists for an improved telepresence system that provides the ability to better simulate a viewer's actual presence in a venue, preferably in real time.

SUMMARY OF THE INVENTION

These and other needs are satisfied by the present invention. A telepresence system according to one embodiment of the present invention includes an array of cameras, each of which has an associated view of an environment and an associated output representing the view. The system also includes a first user interface device having first user inputs associated with movement along a first path in the array. The system further includes a second user interface device having second user inputs associated with movement along a second path in the array. A processing element is coupled to the user interface devices. The processing the element receives and interprets the first inputs and selects outputs of cameras in the first path. Similarly, the processing element receives and interprets the second inputs and selects outputs of cameras in the second path independently of the first inputs. Thus, a first user and a second user are able to navigate simultaneously and independently through the array. In another embodiment of the present invention the telepresence system distinguishes between permissible cameras in the array and impermissible cameras in the array.

BRIEF DESCRIPTION OF THE DRAWINGS

FIG. 6 is a flowchart illustrating in detail a portion of the operation shown in FIG. 5.

FIGS. 7b–7g illustrate views from the perspectives of selected cameras of the array in FIG. 7a.

FIG. 8 is a schematic view of an alternate embodiment of the present invention.

DESCRIPTION OF PREFERRED EMBODIMENTS

1. General Description of Preferred Embodiments

The present invention relates to a telepresence system that, in preferred embodiments, uses modular, interlocking arrays of microcameras. The cameras are on rails, with each rail holding a plurality of cameras. These cameras, each locked in a fixed relation to every adjacent camera on the array and dispersed dimensionally in a given environment, enable remote viewers to navigate through such environment with the same spatial and visual cues (the changing perspective lines, the moving light reflections and shadows) that characterize an actual in-environment transit.

In another preferred embodiment, the outputs of these microcameras are linked by tiny (less than half the width of a human hair) Vertical Cavity Surface Emitting Lasers (VCSELs) to optical fibers, fed through area net hubs, buffered on server arrays or server farms (either for recording or (instantaneous) relay) and sent to viewers at remote terminals, interactive wall screens, or mobile image appliances (like Virtual Retinal Displays). Each remote viewer, through an intuitive graphical user interface (GUI), can navigate effortlessly through the environment, enabling seamless movement through the event.

This involves a multiplexed, electronic switching process (invisible to the viewer) which moves the viewer's point perspective from camera to camera. Rather than relying, per se, on physically moving a microcamera through space, the system uses the multiplicity of positioned microcameras to move the viewer's perspective from microcamera node to adjacent microcamera node in a way that provides the viewer with a sequential visual and acoustical path throughout the extent of the array. This allows the viewer to fluidly track or dolly through a 3-dimensional remote environment, to move through an event and make autonomous real-time decisions about where to move and when to linger.

Instead of investing the viewer with the capacity to physically move a robotic camera, which would immediately limit the number of viewers that could simultaneously control their own course and navigate via a given camera, the System allows the viewer to float between a multiplicity of microcamera outputs in a way that, via electronic switching (and thus movement through the array), merges their fields of view into a seamless motion path.

2. Detailed Description of Preferred Embodiments

Certain embodiments of the present invention will now be described in greater detail with reference to the drawings. It is understood that the operation and functionality of many of the components of the embodiments described herein are known to one skilled in the art and, as such, the present description does not go into detail into such operative and functionality.

Figure 1:
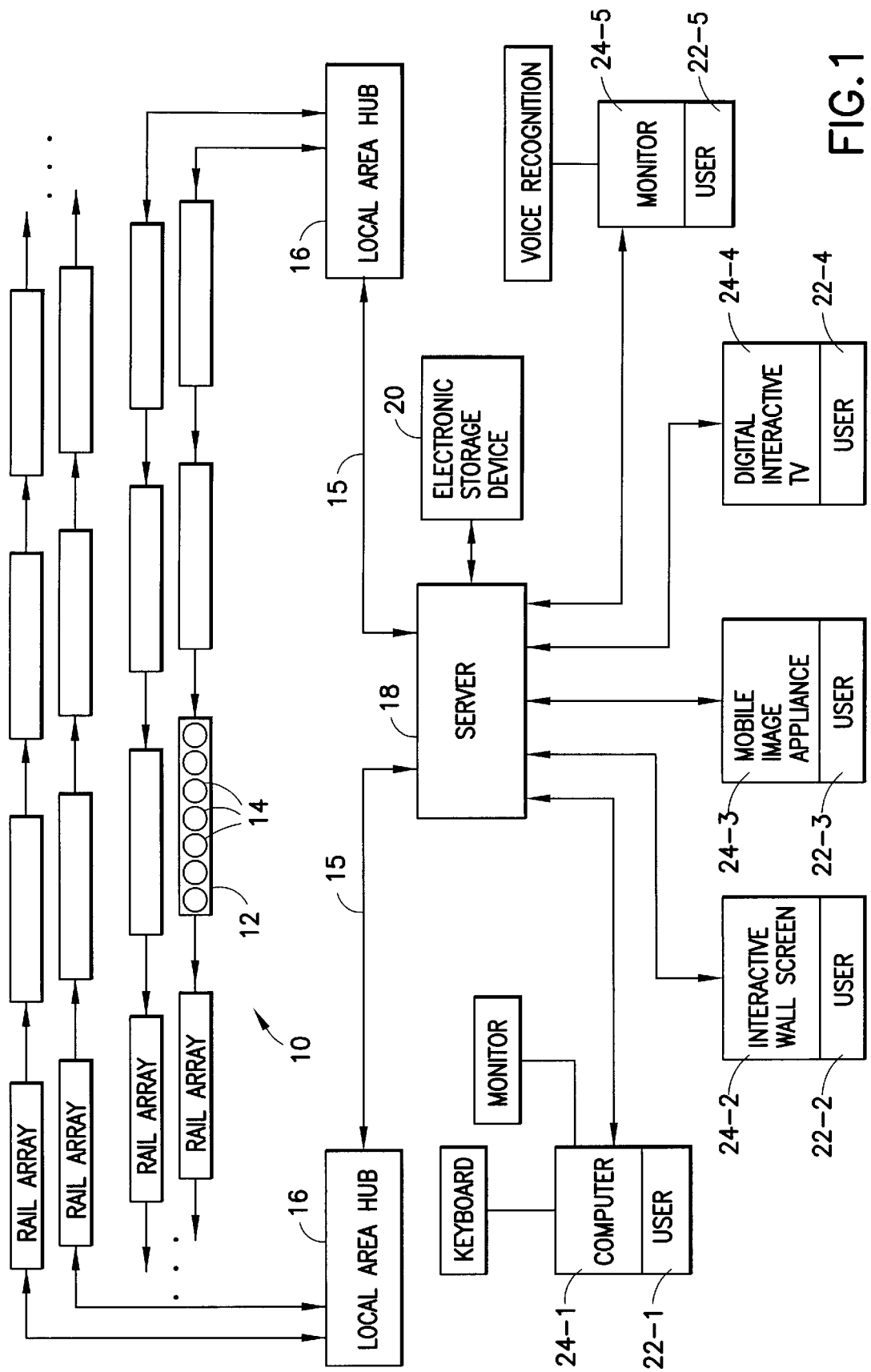
FIG. 1 is an overall schematic of one embodiment of the present invention.
Figure 2A:
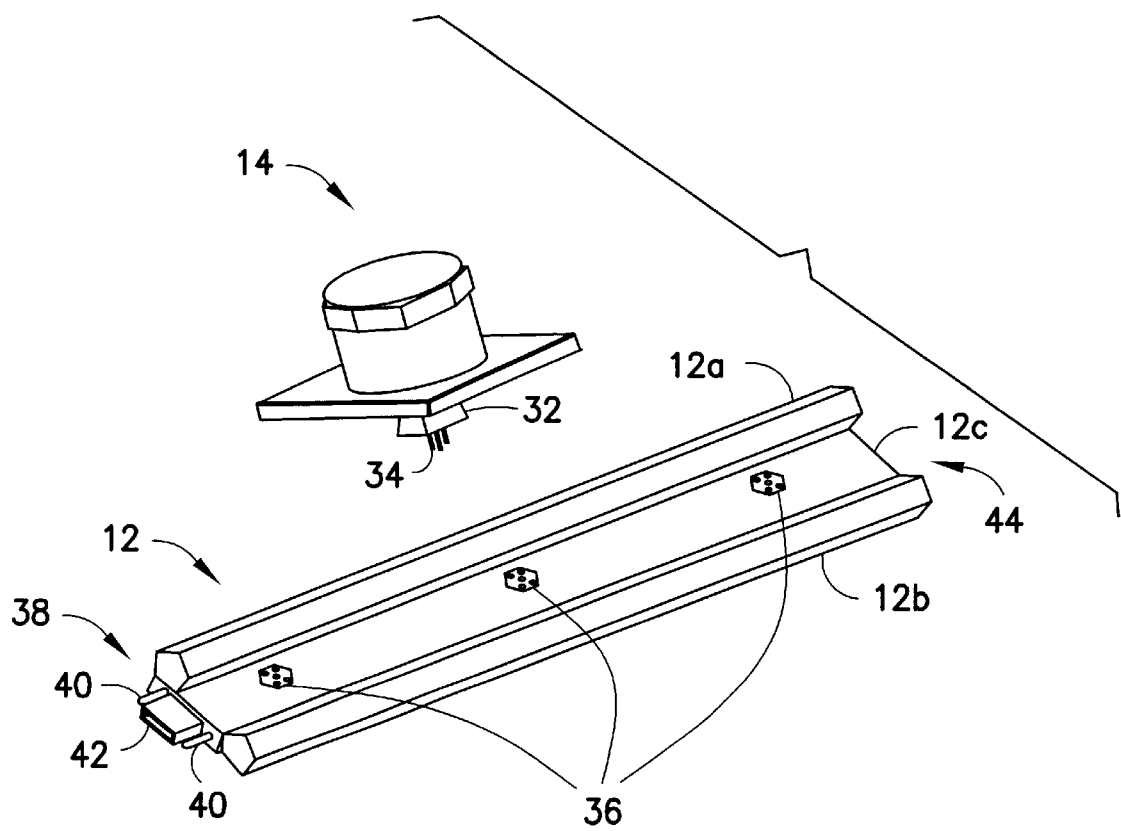
FIG. 2a is a perspective view of a camera and a camera rail section of the array according to one embodiment of the present invention.
Figures 2B, 2C, 2D:
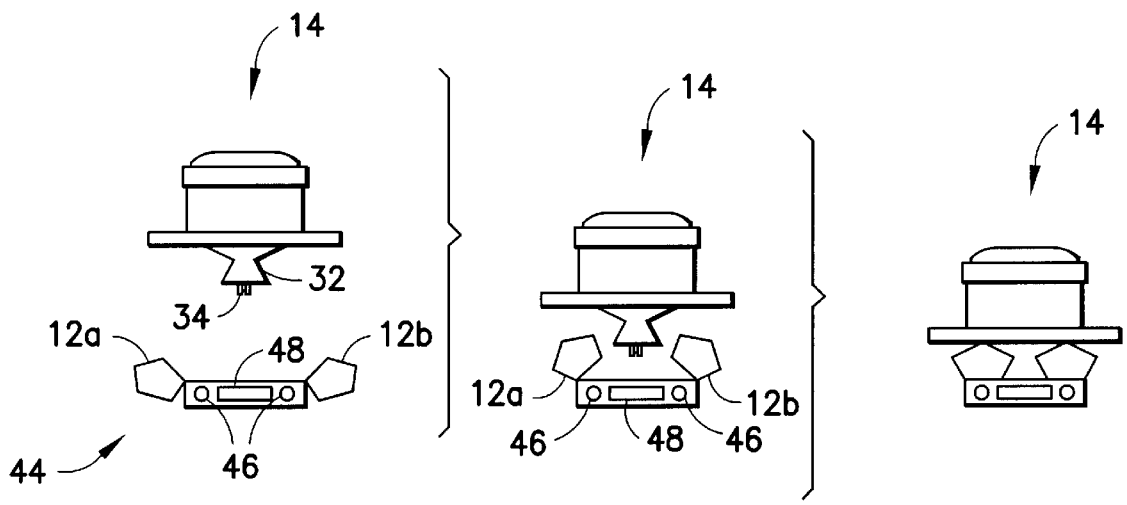
FIGS. 2b–2d are side plan views of a camera and a camera rail according to one embodiment of the present invention.
Figure 2E:
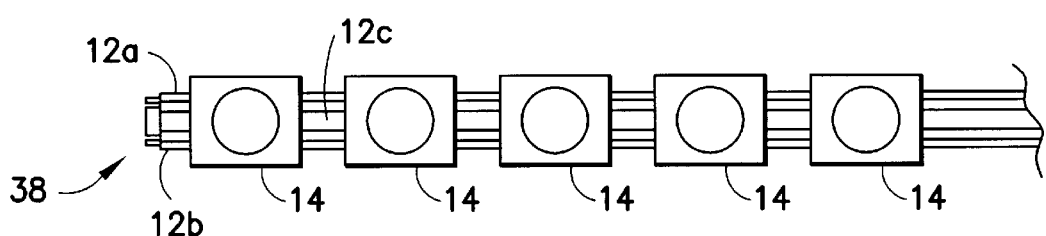
FIG. 2e is a top plan view of a camera rail according to one embodiment of the present invention.

A telepresence system 100 according to the present invention is shown in FIG. 1. The telepresence system 100 generally includes an array 10 of cameras 14 coupled to a server 18, which in turn is coupled to one or more users 22 each having a user interfaced/display device 24. As will be understood to one skilled it the art, the operation and functionality of the embodiment described herein is provided, in part, by the server and user interface/display device. While the operation of these components is not described by way of particular code listings or logic diagrams, it is to be understood that one skilled in the art will be able to arrive at suitable implementations based on the functional and operational details provided herein. Furthermore, the scope of the present invention is not to be construed as limited to any particular code or logic implementation.

In the present embodiment, the camera array 10 is conceptualized as being in an X, Z coordinate system. This allows each camera to have an associated, unique node address comprising an X, and Z coordinate (X, Z). In the present embodiment, for example, a coordinate value corresponding to an axis of a particular camera represents the number of camera positions along that axis the particular camera is displaced from a reference camera. In the present embodiment, from the user's perspective the X axis runs left and right, and the Z axis runs down and up. Each camera 14 is identified by its X, Z coordinate. It is to be understood, however, that other methods of identifying cameras 14 can be used. For example, other coordinate systems, such as those noting angular displacement from a fixed reference point as well as coordinate systems that indicate relative displacement from the current camera node may be used. In another alternate embodiment, the array is three dimensional, located in an X, Y, Z coordinate system.

The array 10 comprises a plurality of rails 12, each rail 12 including a series of cameras 14. In the present preferred embodiment, the cameras 14 are microcameras. The output from the microcameras 14 are coupled to the server 18 by means of local area hubs 16. The local area hubs 16 gather the outputs and, when necessary, amplify the outputs for transmission to the server 18. In an alternate embodiment, the local area hubs 16 multiplex the outputs for transmission to the server 18. Although the figure depicts the communication links 15 between the cameras 14 and the server 18 as being hardwired, it is to be understood that wireless links may be employed. Thus, it is within the scope of the present invention for the communication links 15 to take the form of fiber optics, cable, satellite, microwave transmission, internet, and the like.

Also coupled to the server 18 is an electronic storage device 20. The server 18 transfers the outputs to the electronic storage device 20. The electronic (mass) storage device 20, in turn, transfers each camera's output onto a storage medium or means, such as CD-ROM, DVD, tape, platter, disk array, or the like. The output of each camera 14 is stored in a particular location on the storage medium associated with that camera 14 or is stored with an indication to which camera 14 each stored output corresponds. For example, the output of each camera 14 is stored in contiguous locations on a separate disk, tape, CD-ROM, or platter. As is known in the art, the camera output may be stored in a compressed format, such as JPEG, MPEG1, MPEG2, and the like. Having stored each output allows a user to later view the environment over and over again, each time moving through the array 10 in a new path, as described below. In some embodiments of the present invention, such as those providing only real-time viewing, no storage device is required.

As will be described in detail below, the server 18 receives output from the cameras 14 in the array. The server 18 processes these outputs for either storage in the electronic storage device 20, transmission to the users 22 or both.

It is to be understood that although the server 18 is configured to provide the functionality of the system 100 in the present embodiment, it is to be understood that other processing elements may provide the functionality of the system 100. For example, in alternate embodiments, the user interface device is a personal computer programmed to interpret the user input and transmit an indication of the desired current node address, buffer outputs from the array, and provide other of the described functions.

As shown, the system 100 can accommodate (but does not require) multiple users 22. Each user 22 has associated therewith a user interface device including a user display device (collectively 24). For example, user 22-1 has an associated user interface device and a user display device in the form of a computer 24-1 having a monitor and a keyboard. User 22-2 has associated therewith an interactive wall screen 24-2 which serves as a user interface device and a user display device. The user interface device and the user display device of user 22-3 includes a mobile audio and image appliance 24-3. A digital interactive TV 24-4 is the user interface device and user display device of user 22-4. Similarly, user 22-5 has a voice recognition unit and monitor 24-5 as the user interface and display devices. It is to be understood that the foregoing user interface devices and user display devices are merely exemplary; for example, other interface devices include a mouse, touch screen, biofeedback devices, as well as those identified in U.S. Provisional Patent Application Serial No. 60/080,413 and the like.

As described in detail below, each user interface device 24 has associated therewith user inputs. These user inputs allow each user 22 to move or navigate independently through the array 10. In other words, each user 22 enters inputs to generally select which camera outputs are transferred to the user display device. Preferably, each user display device includes a graphical representation of the array 10. The graphical representation includes an indication of which camera in the array the output of which is being viewed. The user inputs allow each user to not only select particular cameras, but also to select relative movement or navigational paths through the array 10.

As shown in FIG. 1, each user 22 may be coupled to the server 18 by an independent communication link. Furthermore, each communication link may employ different technology. For example, in alternate embodiments, the communication links include an internet link, a microwave signal link, a satellite link, a cable link, a fiber optic link, a wireless link, and the like.

It is to be understood that the array 10 provides several advantages. For example, because the array 10 employs a series of cameras 14, no individual camera, or the entire array 10 for that matter, need be moved in order to obtain a seamless view of the environment. Instead, the user navigates through the array 10, which is strategically placed through and around the physical environment to be viewed. Furthermore, because the cameras 14 of the array 10 are physically located at different points in the environment to be viewed, a user is able to view changes in perspective, a feature unavailable to a single camera that merely changes focal length.

Microcameras

Each camera 14 is preferably a microcamera. The microcameras—microlenses mounted on thumbnail-sized CMOS active pixel sensor (APS) microchips—are arranged in patterns that enable viewers to move radically, in straight lines, or in fluid combinations thereof. The cameras are produced in a mainstream manufacturing process, by several companies, including Photobit, Pasadena, Calif.; Sarnoff Corporation, Princeton, N.J.; and VLSI Vision, Ltd., Edinburgh, Scotland.

Structure of the Array

The structure of the array 10 will now be described in greater detail with reference to FIGS. 2a–2e. In general, the camera array 10 of the present embodiment comprises a series of modular rails 12 carrying microcameras 14. The structure of the rails 12 and cameras 14 will now be discussed in greater detail with reference to FIGS. 2a through 2d. Each camera 14 includes registration pins 34. In the preferred embodiment, the cameras 14 utilize VCSELs to transfer their outputs to the rail 12. It is to be understood that the present invention is not limited to any particular type of camera 14, however, or even to an array 10 consisting of only one type of camera 14.

Each rail 12 includes two sides, 12a, 12b, at least one of which 12b is hingeably connected to the base 12c of the rail 12. The base 12c includes docking ports 36 for receiving the registration pins 34 of the camera 14. When the camera 14 is seated on a rail 12 such that the registration pins 34 are fully engaged in the docking ports 36, the hinged side 12*b* of the rail 12 is moved against the base 32 of the camera 14, thereby securing the camera 14 to the rail 12.

Each rail 12 further includes a first end 38 and a second end 44. The first end 38 includes, in the present embodiment, two locking pins 40 and a protected transmission relay port 42 for transmitting the camera outputs. The second end 44 includes two guide holes 46 for receiving the locking pins 40, and a transmission receiving port 48. Thus, the first end 38 of one rail 12 is engagable with a second end 44 of another rail 12. Therefore, each rail 12 is modular and can be functionally connected to another rail to create the array 10.

Once the camera 14 is securely seated to the rail 12, the camera 14 is positioned such that the camera output may be transmitted via the VCSEL to the rail 12. Each rail 12 includes communication paths for transmitting the output from each camera 14.

Although the array 10 is shown having a particular configuration, it is to be understood that virtually any configuration of rails 12 and cameras 14 is within the scope of the present invention. For example, the array 10 may be a linear array of cameras 14, a 2-dimensional array of cameras 14, a 3-dimensional array of cameras 14, or any combination thereof. Furthermore, the array 10 need not be comprised solely of linear segments, but rather may include curvilinear sections.

The array 10 is supported by any of a number of support means. For example, the array 10 can be fixedly mounted to a wall or ceiling; the array 10 can be secured to a moveable frame that can be wheeled into position in the environment or supported from cables.

Figure 3:
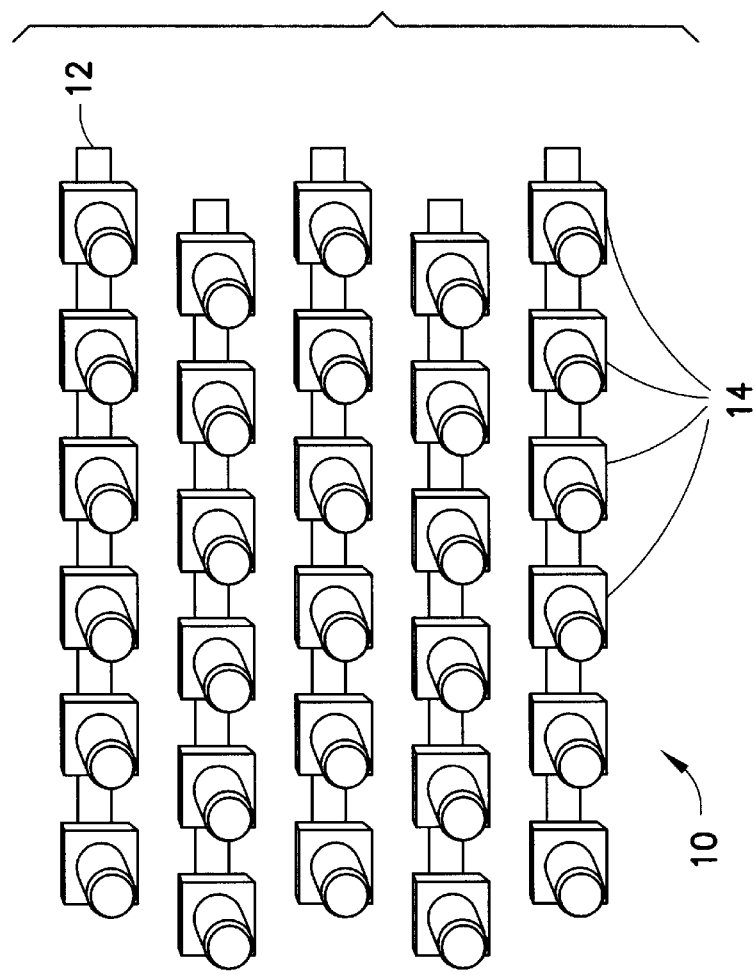
FIG. 3 is a perspective view of a portion of the camera array according to one embodiment of the present invention.

FIG. 3 illustrates an example of a portion of the array 10. As shown, the array 10 comprises five rows of rails 12*a*, through 12*e*. Each of these rails 12*a*–12*e* is directed towards a central plane, which substantially passes through the center row 12*c*. Consequently, for any object placed in the same plane as the middle row 12*c*, a user would be able to view the object essentially from the bottom, front, and top.

Figure 4:
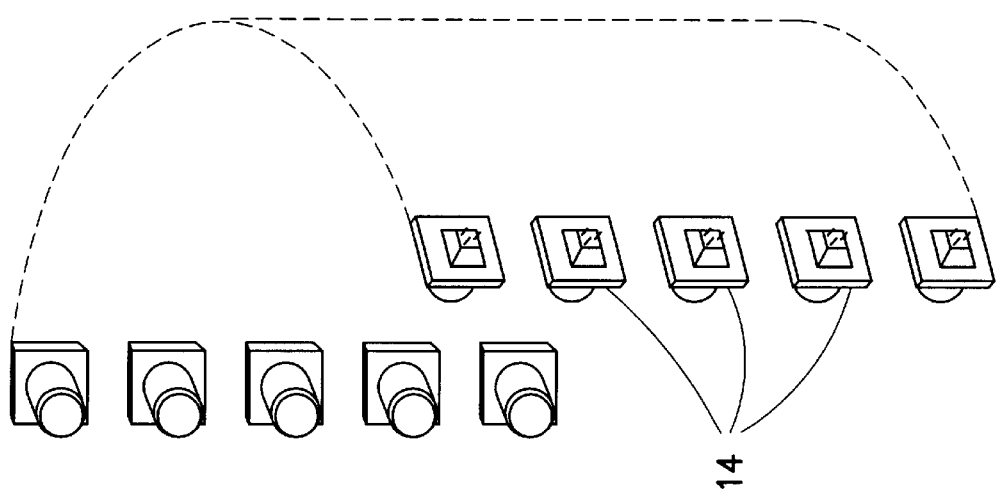
FIG. 4 is a perspective view of a portion of the camera array according to an alternate embodiment of the present invention.

As noted above, the rails 12 of the array 10 need not have the same geometry. For example, some of the rails 12 may be straight while others may be curved. For example, FIG. 4 illustrates the camera alignment that results from utilizing curved rails. It should be noted that rails in FIG. 4 have been made transparent so that the arrangement of cameras 14 may be easily seen.

In an alternate embodiment, each rail is configured in a step-like fashion with each camera above and in front of a previous camera. In such an arrangement, the user has the option of moving forward through the environment.

It is to be understood that the spacing of the microcameras 14 depends on the particular application, including the objects being viewed, the focal length of the microcameras 14, and the speed of movement through the array 10. In one embodiment the distance between microcameras 14 can be approximated by analogy to a conventional movie reel recording projector. In general, the speed of movement of a projector through an environment divided by the frames per unit of time second results in a frame-distance ratio.

For example, as shown by the following equations, in some applications a frame is taken ever inch. A conventional movie projector records twenty-four frames per second. When such a projector is moved through an environment at two feet per second, a frame is taken approximately every inch.

$$\frac{2 \text{ ft}}{\text{sec}} \div \frac{24 \text{ frames}}{\text{sec}} = \frac{2 \text{ ft}}{24 \text{ frames}} = \frac{1 \text{ ft}}{12 \text{ frames}} =$$

$$\frac{12 \text{ inches}}{12 \text{ frames}} = \frac{1 \text{ inch}}{1 \text{ frame}} = 1 \text{ frame per inch.}$$

A frame of the projector is analogous to a camera 14 in the present invention. Thus, where one frame per inch results in a movie having a seamless view of the environment, so too does one camera 14 per inch. Thus, in one embodiment of the present invention the cameras 14 are spaced approximately one inch apart, thereby resulting in a seamless view of the environment.

Navigation Through the System

The general operation of the present embodiment will now be described with reference to FIG. 5 and continuing reference to FIG. 1. As shown in step 110, the user is presented with a predetermined starting view of the environment corresponding to a starting camera. It is to be understood that the operation of the system is controlled, in part, by software residing in the server. As noted above, the system associates each camera in the array with a coordinate. Thus, the system is able to note the coordinates of the starting camera node. The camera output and, thus the corresponding view, changes only upon receiving a user input.

When the user determines that they want to move or navigate through the array, the user enters a user input through the user interface device 24. As described below, the user inputs of the present embodiment generally include moving to the right, to the left, up, or down in the array. Additionally, a user may jump to a particular camera in the array. In alternate embodiments, a subset of these or other inputs, such as forward, backward, diagonal, over, and under, are used. The user interface device, in turn, transmits the user input to the server in step 120.

Next, the server receives the user input in step 130 and proceeds to decode the input. In the present embodiment, decoding the input generally involves determining whether the user wishes to move to the right, to the left, up, or down in the array.

On the other hand, if the received user input does not correspond to backward, then The server 18 proceeds to determine whether the input corresponds to moving to the user's right in the array 10. This determination is shown in step 140. If the received user input does correspond to moving to the right, the current node address is incremented along the X axis in step 150 to obtain an updated address.

If the received user input does not correspond to moving to the right in the array, the server 18 then determines whether the input corresponds to moving to the user's left in the array 10 in step 160. Upon determining that the input does correspond to moving to the left, the server 18 then decrements the current node address along the X axis to arrive at the updated address. This is shown in step 170.

If the received user input does not correspond to either moving to the right or to the left, the server 18 then determines whether the input corresponds to moving up in the array. This determination is made in step 180. If the user input corresponds to moving up, in step 190, the server 18 increments the current node address along the Z axis, thereby obtaining an updated address.

Next, the server 18 determines whether the received user input corresponds to moving down in the array 10. This determination is made in step 200. If the input does correspond to moving down in the array 10, in step 210 the server 18 decrements the current node address along the Z axis.

Lastly, in step 220 the server 18 determines whether the received user input corresponds to jumping or changing the view to a particular camera 14. As indicated in FIG. 5, if the input corresponds to jumping to a particular camera 14, the server 18 changes the current node address to reflect the desired camera position. Updating the node address is shown as step 230. In an alternate embodiment, the input corresponds to jumping to a particular position in the array 10, not identified by the user as being a particular camera but by some reference to the venue, such as stage right.

It is to be understood that the server 18 may decode the received user inputs in any of a number of ways, including in any order. For example, in an alternate embodiment the server 18 first determines whether the user input corresponds to up or down. In another alternate, preferred embodiment, user navigation includes moving forward, backward, to the left and right, and up and down through a three dimensional array.

If the received user input does not correspond to any of the recognized inputs, namely to the right, to the left, up, down, or jumping to a particular position in the array 10 then in step 240, the server 18 causes a message signal to be transmitted to the user display device 24, causing a message to be displayed to the user 22 that the received input was not understood. Operation of the system 100 then continues with step 120, and the server 18 awaits receipt of the next user input.

After adjusting the current node address, either by incrementing or decrementing the node address along an axis or by jumping to a particular node address, the server 18 proceeds in step 250 to adjust the user's view. Once the view is adjusted, operation of the system 100 continues again with step 120 as the server 18 awaits receipt of the next user input.

In an alternate embodiment, the server 18 continues to update the node address and adjust the view based on the received user input. For example, if the user input corresponded to "moving to the right", then operation of the system 100 would continuously loop through steps 140, 150, and 250, checking for a different input. When the different input is received, the server 18 continuously updates the view accordingly.

It is to be understood that the foregoing user inputs, namely, to the right, to the left, up, and down, are merely general descriptions of movement through the array. Although the present invention is not so limited, in the present preferred embodiment, movement in each of these general directions is further defined based upon the user input.

Figure 5:
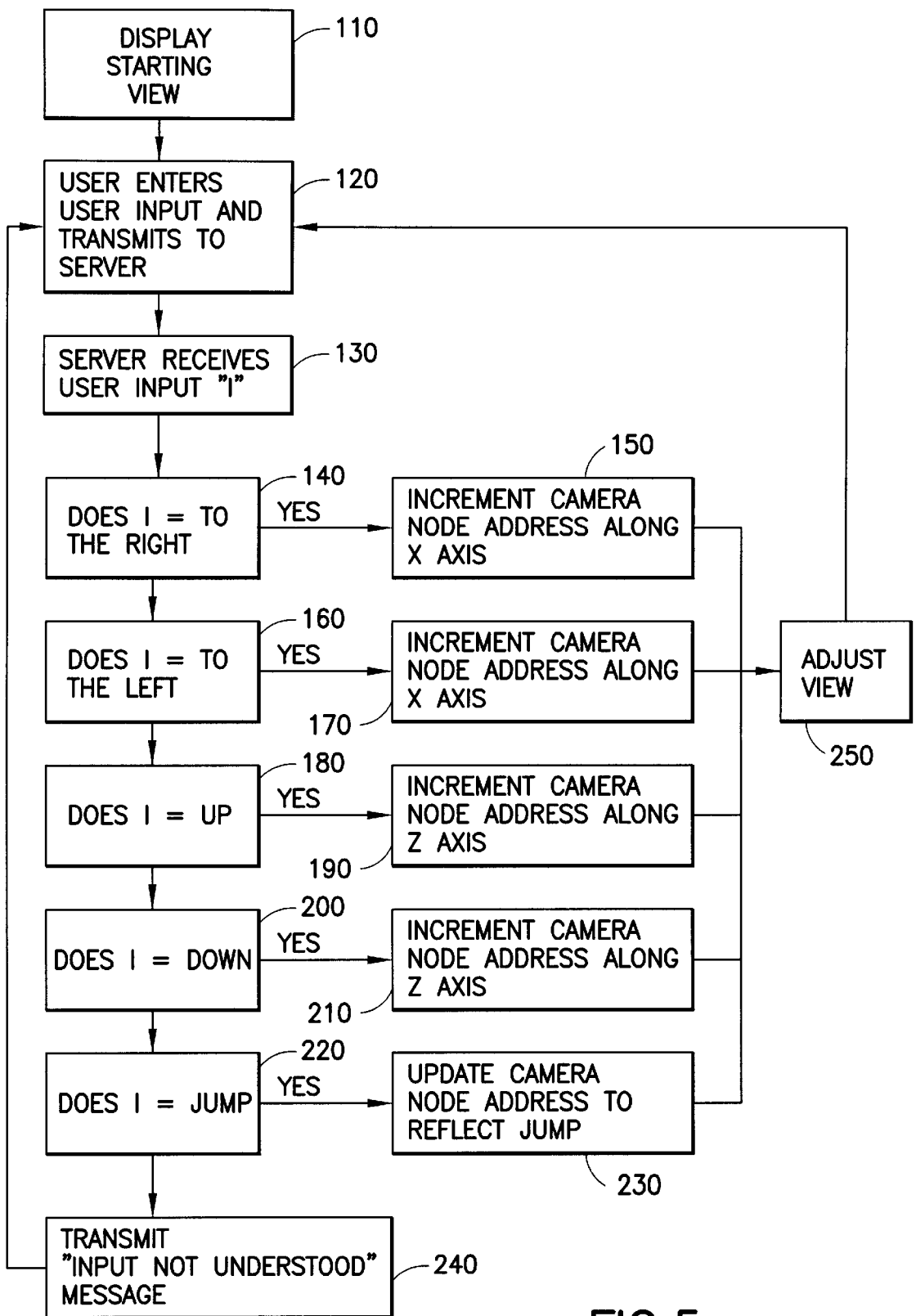
FIG. 5 is a flowchart illustrating the general operation of the user interface according to one embodiment of the present invention.

Accordingly, FIG. 6 is a more detailed diagram of the operation of the system according to steps 140, 150, and 250 of FIG. 5. Moreover, it is to be understood that while FIG. 6 describes more detailed movement one direction i.e., to the right, the same detailed movement can be applied in any other direction. As illustrated, the determination of whether the user input corresponds to moving to the right actually involves several determinations. As described in detail below, these determinations include moving to the right through the array 10 at different speeds, moving to the right into a composited additional source output at different speeds, and having the user input overridden by the system 100.

The present invention allows a user 22 to navigate through he array 10 at the different speeds. Depending on the speed (i.e. number of camera nodes transversed per unit of time) indicated by the user's input, such as movement of a pointing device (or other interface device), the server 18 will apply an algorithm that controls the transition between camera outputs either at critical speed (n nodes/per unit of time), under critical speed (n−1 nodes/per unit of time), or over critical speed (n+1 nodes/per unit of time).

It is to be understood that speed of movement through the array 10 can alternatively be expressed as the time to switch from one camera 14 to another camera 14.

Specifically, as shown in step 140a, the server 18 makes the determination whether the user input corresponds to moving to the right at a critical speed. The critical speed is preferably a predetermined speed of movement through the array 10 set by the system operator or designer depending on the anticipated environment being viewed. Further, the critical speed depends upon various other factors, such as focal length, distance between cameras, distance between the cameras and the viewed object, and the like. The speed of movement through the array 10 is controlled by the number of cameras 14 traversed in a given time period. Thus, the movement through the array 10 at critical speed corresponds to traversing some number, "n", camera nodes per millisecond, or taking some amount of time, "s", to switch from one camera 14 to another. It is to be understood that in the same embodiment the critical speed of moving through the array 10 in one dimension need not equal the critical speed of moving through the array in another dimension. Consequently, the server 18 increments the current node address along the X axis at n nodes per millisecond.

In the present preferred embodiment the user traverses twenty-four cameras 14 per second. As discussed above, a movie projector records twenty-four frames per second. Analogizing between the movie projector and the present invention, at critical the user traverses (and the server 18 switches between) approximately twenty-four cameras 14 per second, or a camera 14 approximately every 0.04167 seconds.

As shown in FIG. 6, the user 22 may advance not only at critical speed, but also at over the critical speed, as shown in step 140b, or at under the critical speed, as shown in step 140c. Where the user input "I" indicates movement through the array 10 at over the critical speed, the server 18 increments the current node address along the X axis by a unit of greater than n, for example, at n+2 nodes per millisecond. The step of incrementing the current node address at n+1 nodes per millisecond along the X axis is shown in step 150b. Where the user input "I" indicates movement through the array 10 at under the critical speed, the server 18 proceeds to increment the current node address at a variable less than n, for example, at n−1 nodes per millisecond. This operation is shown as step 150c.

Scaleable Arrays

The shape of the array 10 can also be electronically scaled and the system 100 designed with a "center of gravity" that will ease a user's image path back to a "starting" or "critical position" node or ring of nodes, either when the user 22 releases control or when the system 100 is programmed to override the user's autonomy; that is to say, the active perimeter or geometry of the array 10 can be pre-configured to change at specified times or intervals in order to corral or focus attention in a situation that requires dramatic shaping. The system operator can, by real-time manipulation or via a pre-configured electronic proxy sequentially activate or deactivate designated portions of the camera array 10. This is of particular importance in maintaining authorship and dramatic pacing in theatrical or entertainment venues, and also for implementing controls over how much freedom a user 22 will have to navigate through the array 10.

In the present embodiment, the system 100 can be programmed such that certain portions of the array 10 are unavailable to the user 22 at specified times or intervals. Thus, continuing with step 140d of FIG. 6, the server 18 makes the determination whether the user input corresponds to movement to the right through the array but is subject to a navigation control algorithm. The navigation control algorithm causes the server 18 to determine, based upon navigation control factors, whether the user's desired movement is permissible.

More specifically, the navigation control algorithm, which is programmed in the server 18, determines whether the desired movement would cause the current node address to fall outside the permissible range of node coordinates. In the present embodiment, the permissible range of node coordinates is predetermined and depends upon the time of day, as noted by the server 18. Thus, in the present embodiment, the navigation control factors include time. As will be appreciated by those skilled in the art, permissible camera nodes and control factors can be correlated in a table stored in memory.

In an alternate embodiment, the navigation control factors include time as measured from the beginning of a performance being viewed, also as noted by the server. In such an embodiment, the system operator can dictate from where in the array a user will view certain scenes. In another alternate embodiment, the navigation control factor is speed of movement through the array. For example, the faster a user 22 moves or navigates through the array, the wider the turns must be. In other alternate embodiments, the permissible range of node coordinates is not predetermined. In one embodiment, the navigation control factors and, therefore, the permissible range, is dynamically controlled by the system operator who communicates with the server via an input device.

Having determined that the user input is subject to the navigation control algorithm, the server 18 further proceeds, in step 150d, to increment the current node address along a predetermined path. By incrementing the current node address along a predetermined path, the system operator is able to corral or focus the attention of the user 22 to the particular view of the permissible cameras 14, thereby maintaining authorship and dramatic pacing in theatrical and entertainment venues.

In an alternate embodiment where the user input is subject to a navigation control algorithm, the server 18 does not move the user along a predetermined path. Instead, the server 18 merely awaits a permissible user input and holds the view at the current node. Only when the server 18 receives a user input resulting in a permissible node coordinate will the server 18 adjust the user's view.

Additional Source Output

In addition to moving through the array 10, the user 22 may, at predetermined locations in the array 10, choose to leave the real world environment being viewed. More specifically, additional source outputs, such as computer graphic imagery, virtual world imagery, applets, film clips, and other artificial and real camera outputs, are made available to the user 22. In one embodiment, the additional source output is composited with the view of the real environment. In an alternate embodiment, the user's view transfers completely from the real environment to that offered by the additional source output.

More specifically, the additional source output is stored (preferably in digital form) in the electronic storage device 20. Upon the user 22 inputting a desire to view the additional source output, the server 18 transmits the additional source output to the user interface/display device 24. The present embodiment, the server 18 simply transmits the additional source output to the user display device 24. In an alternate embodiment, the server 18 first composites the additional source output with the camera output and then transmits the composited signal to the user interface/display device 24.

As shown in step 140e, the server 18 makes the determination whether the user input corresponds to moving in the array into the source output. If the user 22 decides to move into the additional source output, the server 18 adjusts the view by substituting the additional source output for the updated camera output identified in either of steps 150a–d.

Once the current node address is updated in either of steps 150a–d, the server 18 proceeds to adjust the user's view in step 250. When adjusting the view, the server 18 "mixes" the existing or current camera output being displayed with the output of the camera 14 identified by the updated camera node address. Mixing the outputs is achieved differently in alternate embodiments of the invention. In the present embodiment, mixing the outputs involves electronically switching at a particular speed from the existing camera output to the output of the camera 14 having the new current node address.

It is to be understood that in this and other preferred embodiments disclosed herein, the camera outputs are synchronized. As is well known in the art, a synchronizing signal from a "sync generator" is supplied to the cameras. The sync generator may take the form of those used in video editing and may comprise, in alternate embodiments, part of the server, the hub, and/or a separate component coupled to the array.

As described above, at critical speed, the server 18 switches camera outputs approximately at a rate of 24 per second, or one every 0.04167 seconds. If the user 22 is moving through the array 10 at under the critical speed, the outputs of the intermediate cameras 14 are each displayed for a relatively longer duration than if the user is moving at the critical speed. Similarly, each output is displayed for a relatively shorter duration when a user navigates at over the critical speed. In other words, the server 18 adjusts the switching speed based on the speed of the movement through the array 10.

Of course, it is to be understood that in a simplified embodiment of the present invention, the user may navigate at only the critical speed.

In another alternate embodiment, mixing the outputs is achieved by compositing the existing or current output and the updated camera node output. In yet another embodiment, mixing involves dissolving the existing view into the new view. In still another alternate embodiment, mixing the outputs includes adjusting the frame refresh rate of the user display device. Additionally, based on speed of movement through the array, the server may add motion blur to convey the realistic sense of speed.

In yet another alternate embodiment, the server causes a black screen to be viewed instantaneously between camera views. Such an embodiment is analogous to blank film between frames in a movie reel. Furthermore, although not always advantageous, such black screens reduce the physiologic "carrying over" of one view into a subsequent view.

It is to be understood that the user inputs corresponding to movements through the array at different speeds may include either different keystrokes on a keypad, different positions of a joystick, positioning a joystick in a given position for a predetermined length of time, and the like. Similarly, the decision to move into an additional source output may be indicated by a particular keystroke, joystick movement, or the like.

Figure 7A:
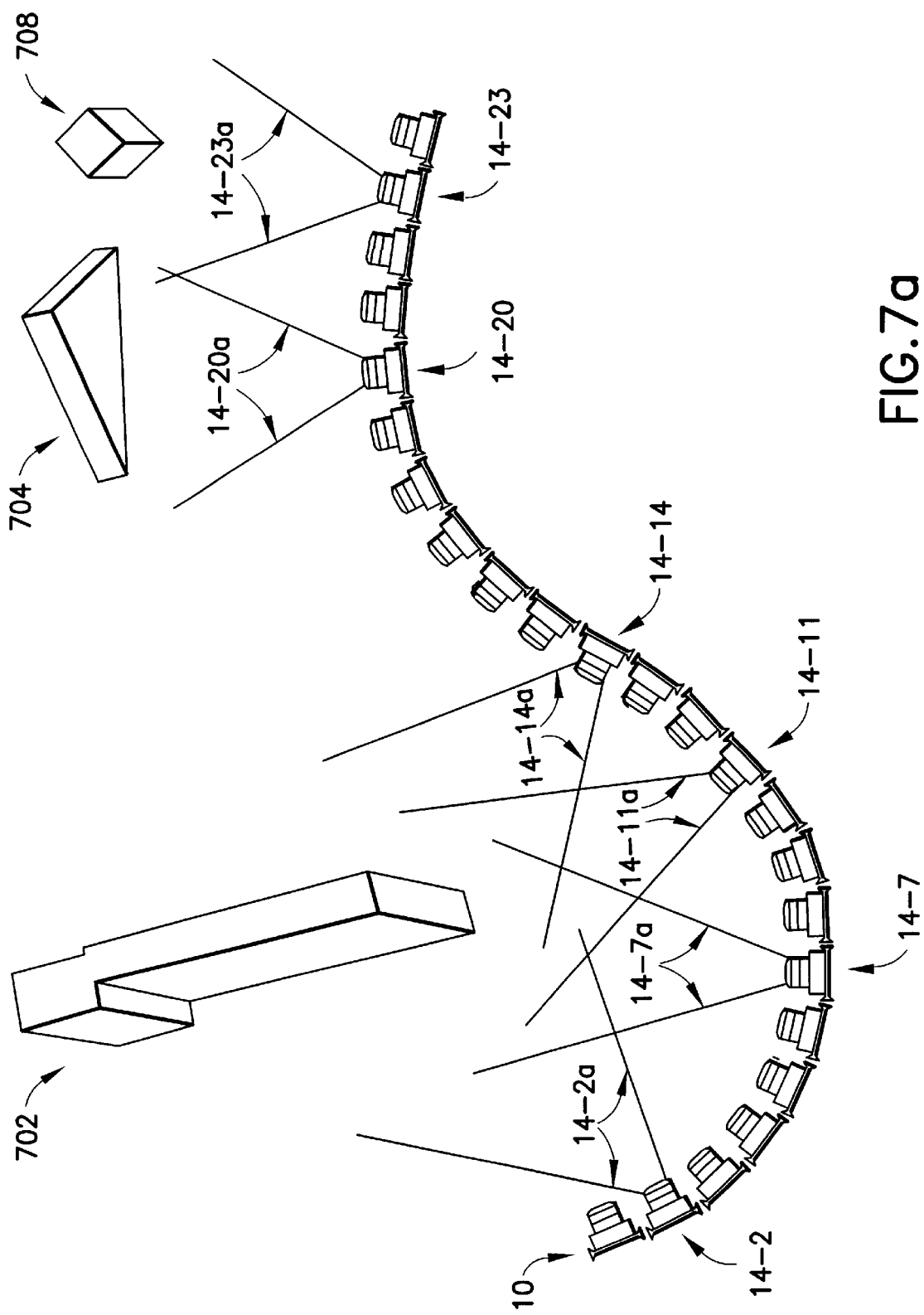
FIG. 7a is a perspective view of a portion of one embodiment of the present invention illustrating the arrangement of the camera array relative to objects being viewed.

In an alternate embodiment, although not always necessary, to ensure a seamless progression of views, the server 18 also transmits to the user display device 24 outputs from some or all of the intermediate cameras, namely those located between the current camera node and the updated camera node. Such an embodiment will now be described with reference to FIGS. 7a–7g. Specifically, FIG. 7a illustrates a curvilinear portion of an array 10 that extends along the X axis or to the left and right from the user's perspective. Thus, the coordinates that the server 18 associates with the cameras 14 differ only in the X coordinate. More specifically, for purposes of the present example, the cameras 14 can be considered sequentially numbered, starting with the left-most camera 14 being the first, i.e., number "1". The X coordinate of each camera 14 is equal to the camera's position in the array. For illustrative purposes, particular cameras will be designate 14-X, where X equals the camera's position in the array 10 and, thus, its associated X coordinate.

In general, FIGS. 7a–7g illustrate possible user movement through the array 10. The environment to be viewed includes three objects 602, 604, 606, the first and second of which include numbered surfaces. As will be apparent, these numbered surface allow a better appreciation of the change in user perspective.

In FIG. 7a, six cameras 14-2, 14-7, 14-11, 14-14, 14-20, 14-23 of the array 10 are specifically identified. The boundaries of each camera's view is identified by the pair of lines 14-2a, 14-7a, 14-11a, 14-14a, 14-20a, 14-23a, radiating from each identified camera 14-2, 14-7, 14-11, 14-14, 14-20, 14-23, respectively. As described below, in the present example the user 22 navigates through the array 10 along the X axis such that the images or views of the environment are those corresponding to the identified cameras 14-2, 14-7, 14-11, 14-14, 14-20, 14-23.

Figure 7D:
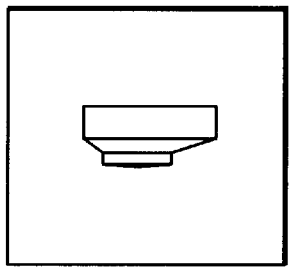
Figure 7G:
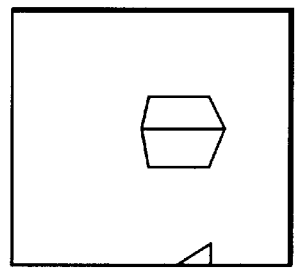
Figure 7C:
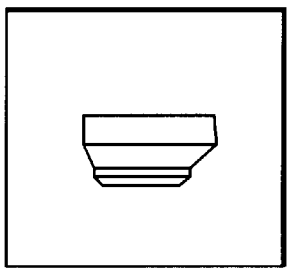
Figure 7F:
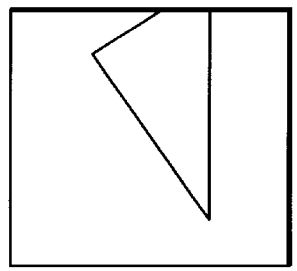
Figure 7B:
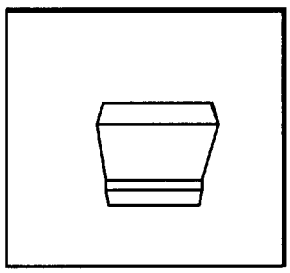

The present example provides the user 22 with the starting view from camera 14-2. This view is illustrated in FIG. 7b. The user 22, desiring to have a better view of the object 702, pushes the "7" key on the keyboard. This user input is transmitted to and interpreted by the server 18.

Because the server 18 has been programmed to recognized the "7" key as corresponding to moving or jumping through the array to camera 14-7. The server 18 changes the X coordinate of the current camera node address to 7, selects the output of camera 14-7, and adjusts the view or image sent to the user 22. Adjusting the view, as discussed above, involves mixing the outputs of the current and updated camera nodes. Mixing the outputs, in turn, involves switching intermediate camera outputs into the view to achieve the seamless progression of the discrete views of cameras 14-2 through 14-7, which gives the user 22 the look and feel of moving around the viewed object. The user 22 now has another view of the first object 702. The view from camera 14-7 is shown in FIG. 7c. As noted above, if the jump in camera nodes is greater than a predetermined limit, the server 18 would omit some or all of the intermediate outputs.

Pressing the "right arrow" key on the keyboard, the user 22 indicates to the system 100 a desire to navigate to the right at critical speed. The server 18 receives and interprets this user input as indicating such and increments the current camera node address by n=4. Consequently, the updated camera node address is 14-11. The server 18 causes the mixing of the output of camera 14-11 with that of camera 14-7. Again, this includes switching into the view the outputs of the intermediate cameras (i.e., 14-8, 14-9, and 14-10) to give the user 22 the look and feel of navigating around the viewed object. The user 22 is thus presented with the view from camera 14-11, as shown in FIG. 7d.

Figure 7E:
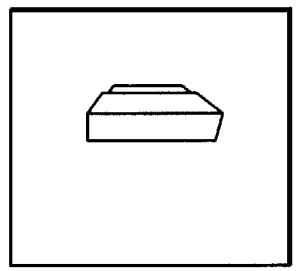

Still interested in the first object 702, the user 22 enters a user input, for example, "alt-right arrow," indicating a desire to move to the right at less than critical speed. Accordingly, the server 18 increments the updated camera node address by n-1 nodes, namely 3 in the present example, to camera 14-14. The outputs from cameras 14-11 and 14-14 are mixed, and the user 22 is presented with a seamless view associated with cameras 14-11 through 14-14. FIG. 7e illustrates the resulting view of camera 14-14.

With little to see immediately after the first object 702, the user 22 enters a user input such as "shift-right arrow," indicating a desire to move quickly through the array 10, i.e., at over the critical speed. The server 18 interprets the user input and increments the current node address by n+2, or 6 in the present example. The updated node address thus corresponds to camera 14-20. The server 18 mixes the outputs of cameras 14-14 and 14-20, which includes switching into the view the outputs of the intermediate cameras 14-15 through 14-19. The resulting view of camera 14-20 is displayed to the user 22. As shown in FIG. 7f, the user 22 now views the second object 704.

Becoming interested in the third object 704, the user 22 desires to move slowly through the array 10. Accordingly, the user 22 enters "alt-right arrow" to indicate moving to the right at below critical speed. Once the server 18 interprets the received user input, it updates the current camera node address along the X axis by 3 to camera 14-23. The server 18 then mixes the outputs of camera 14-20 and 14-23, thereby providing the user 22 with a seamless progression of views through camera 14-23. The resulting view 14-23a is illustrated in FIG. 7g.

Other Data Devices

It is to be understood that devices other than cameras may be interspersed in the array. These other devices, such as motion sensors and microphones, provide data to the server (s) for processing. For example, in alternate embodiments output from motion sensors or microphones are fed to the server(s) and used to scale the array. More specifically, permissible camera nodes (as defined in a table stored in memory) are those near the sensor or microphone having a desired output e.g., where there is motion or sound. As such, navigation control factors include output from other such devices. Alternatively, the output from the sensors or microphones are provided to the user.

An alternate embodiment in which the array of cameras includes multiple microphones interspersed among the viewed environment and the cameras will now be described with reference to FIG. 8. The system 800 generally includes an array of cameras 802 coupled to a server 804, which, in turn, is coupled to one or more user interface and display devices 806 and an electronic storage device 808. A hub 810 collects and transfers the outputs from the array 802 to the server 804. More specifically, the array 802 comprises modular rails 812 that are interconnected. Each rail 812 carries multiple microcameras 814 and a microphone 816 centrally located at rail 812. Additionally, the system 800 includes microphones 818 that are physically separate from the array 802. The outputs of both the cameras 814 and microphones 816, 818 are coupled to the server 804 for processing.

In general, operation of the system 800 proceeds as described with respect to system 100 of FIGS. 1–2d and 5–6. Beyond the operation of the previously described system 100, however, the server 804 receives the sound output from the microphones 816, 818 and, as with the camera output, selectively transmits sound output to the user. As the server 804 updates the current camera node address and changes the user's view, it also changes the sound output transmitted to the user. In the present embodiment, the server 804 has stored in memory an associated range of camera nodes with a given microphone, namely the cameras 814 on each rail 810 are associated with the microphone 816 on that particular rail 810. In the event a user attempts to navigate beyond the end of the array 802, the server 804 determines the camera navigation is impermissible and instead updates the microphone node output to that of the microphone 818 adjacent to the array 802.

In an alternate embodiment, the server 804 might include a database in which camera nodes in a particular area are associated with a given microphones. For example, a rectangle defined by the (X, Y, Z) coordinates (0,0,0), (10,0,0), (10,5,0), (0,5,0), (0,0,5), (10,0,5), (10,5,5) and (0,5,5) are associated with a given microphone. It is to be understood that selecting one of the series of microphones based on the user's position (or view) in the array provides the user with a sound perspective of the environment that coincides with the visual perspective.

Figure 9:
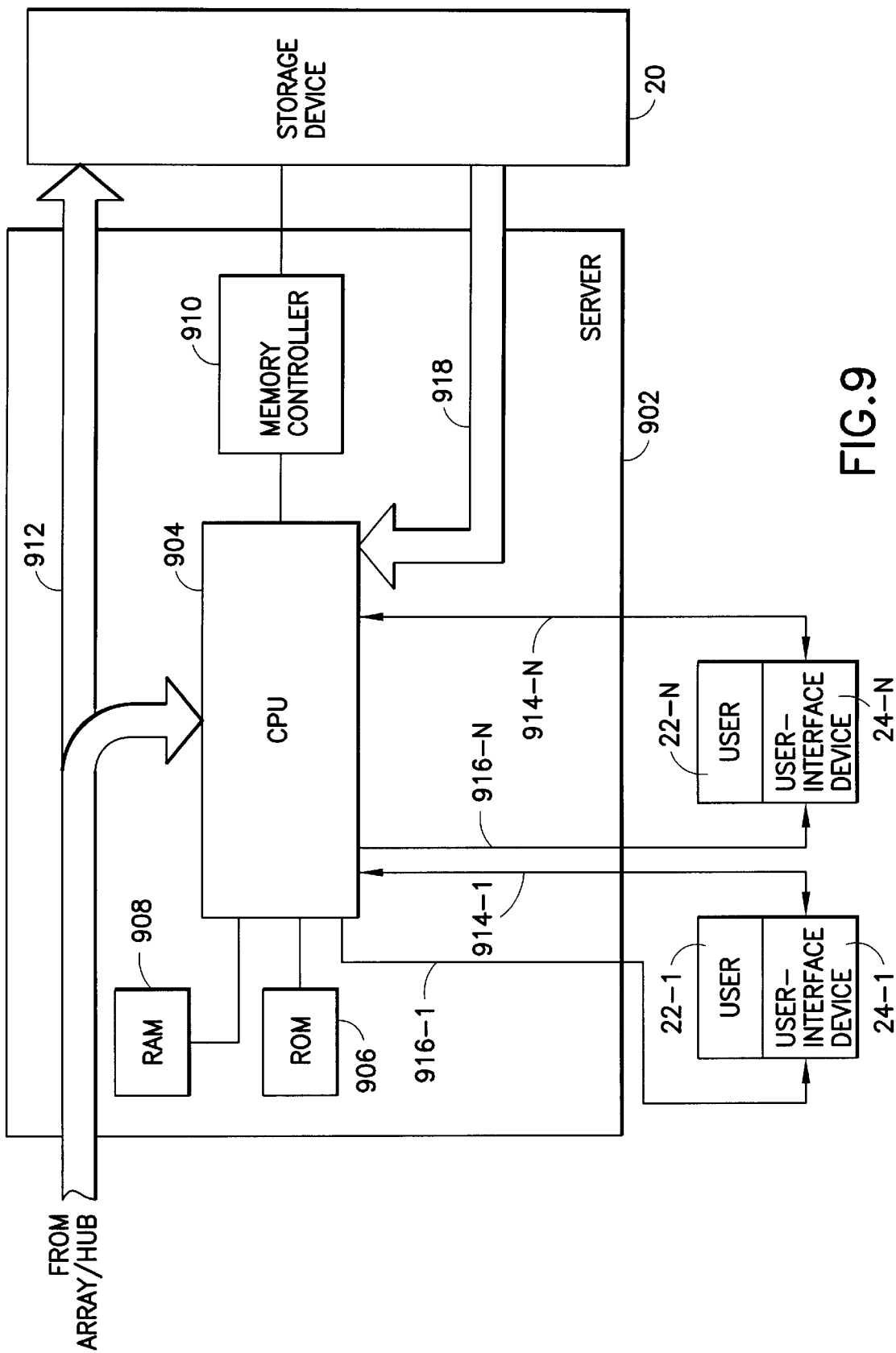
FIG. 9 is a schematic view of a server according to one embodiment of the present invention.

It is to be understood that the server of the embodiments discussed above may take any of a number of known configurations. Two examples of server configurations suitable for use with the present invention will be described with reference to FIGS. 9 and 10. Turning first to FIG. 9, the server 902, electronic storage device 20, array 10, users (1,2,3, . . . N) 22-1–22-N, and associated user interface/display devices 24-1–24-N are shown therein.

The server 902 includes, among other components, a processing means in the form of one or more central processing units (CPU) 904 coupled to associated read only memory (ROM) 906 and a random access memory (RAM) 908. In general, ROM 906 is for storing the program that dictates the operation of the server 902, and the RAM 908 is for storing variables and values used by the CPU 904 during operation. Also coupled to the CPU 904 are the user interface/display devices 24. It is to be understood that the CPU may, in alternate embodiments, comprise several processing units, each performing a discrete function.

Coupled to both the CPU 904 and the electronic storage device 20 is a memory controller 910. The memory controller 910, under direction of the CPU 904, controls accesses (reads and writes) to the storage device 20. Although the memory controller 910 is shown as part of the server 902, it is to be understood that it may reside in the storage device 20.

During operation, the CPU 904 receives camera outputs from the array 10 via bus 912. As described above, the CPU 904 mixes the camera outputs for display on the user interface/display device 24. Which outputs are mixed depends on the view selected by each user 22. Specifically, each user interface/display devices 24 transmits across bus 914 the user inputs that define the view to be displayed. Once the CPU 904 mixes the appropriate outputs, it transmits the resulting output to the user interface/display device 24 via bus 916. As shown, in the present embodiment, each user 22 is independently coupled to the server 902.

The bus 912 also carries the camera outputs to the storage device 20 for storage. When storing the camera outputs, the CPU 904 directs the memory controller 910 to store the output of each camera 14 in a particular location of memory in the storage device 20.

When the image to be displayed has previously been stored in the storage device 20, the CPU 904 causes the memory controller 910 to access the storage device 20 to retrieve the appropriate camera output. The output is thus transmitted to the CPU 904 via bus 918 where it is mixed. Bus 918 also carries additional source output to the CPU 904 for transmission to the users 22. As with outputs received directly from the array 10, the CPU 904 mixes these outputs and transmits the appropriate view to the user interface/display device 24.

Figure 10:
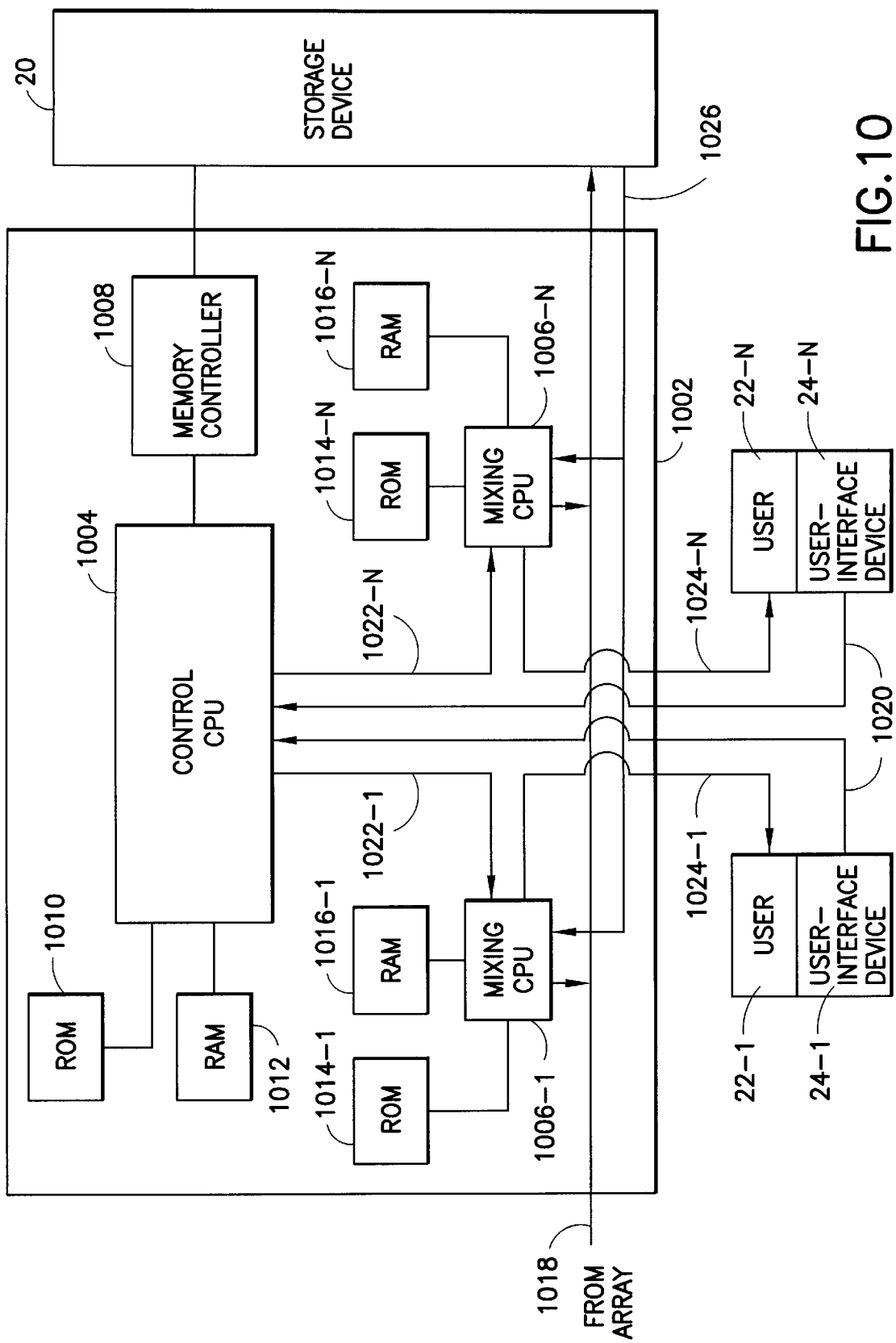
FIG. 10 is a schematic view of a server according to an alternate embodiment of the present invention.

FIG. 10 shows a server configuration according to an alternate embodiment of the present invention. As shown therein, the server 1002 generally comprises a control central processing unit (CPU) 1004, a mixing CPU 1006 associated with each user 22, and a memory controller 1008. The control CPU 1004 has associated ROM 1010 and RAM 1012. Similarly, each mixing CPU 1006 has associated ROM 1014 and RAM 1016.

To achieve the functionality described above, the camera outputs from the array 10 are coupled to each of the mixing CPUs 1 through N 1006-1, 1006-N via bus 1018. During operation, each user 22 enters inputs in the interface/display device 24 for transmission (via bus 1020) to the control CPU 1004. The control CPU 1004 interprets the inputs and, via buses 1022-1, 1022-N, transmits control signals to the mixing CPUs 1006-1, 1006-N instructing them which camera outputs received on bus 1018 to mix. As the name implies, the mixing CPUs 1006-1, 1006-N mix the outputs in order to generate the appropriate view and transmit the resulting view via buses 1024-1, 1024-N to the user interface/display devices 24-1, 24-N.

In an alternate related embodiment, each mixing CPU 1006 multiplexes outputs to more than one user 22. Indications of which outputs are to mixed and transmitted to each user 22 comes from the control CPU 1004.

The bus 1018 couples the camera outputs not only to the mixing CPUs 1006-1, 1006-N, but also to the storage device 20. Under control of the memory controller 1008, which in turn is controlled by the control CPU 1004, the storage device 20 stores the camera outputs in known storage locations. Where user inputs to the control CPU 1004 indicate a users' 22 desire to view stored images, the control CPU 1004 causes the memory controller 1008 to retrieve the appropriate images from the storage device 20. Such images are retrieved into the mixing CPUs 1006 via bus 1026. Additional source output is also retrieved to the mixing CPUs 1006-1, 1006-N via bus 1026. The control CPU 1004 also passes control signals to the mixing CPUs 1006-1, 1006-N to indicate which outputs are to be mixed and displayed.

Stereoscopic Views

It is to be understood that it is within the scope of the present invention to employ stereoscopic views of the environment. To achieve the stereoscopic view, the system retrieves from the array (or the electronic storage device) and simultaneously transmits to the user at least portions of outputs from two cameras. The server processing element mixes these camera outputs to achieve a stereoscopic output. Each view provided to the user is based on such a stereoscopic output. In one stereoscopic embodiment, the outputs from two adjacent cameras in the array are used to produce one stereoscopic view. Using the notation of FIGS. 7a–7g, one view is the stereoscopic view from cameras 14-1 and 14-2. The next view is based on the stereoscopic output of cameras 14-2 and 14-3 or two other cameras. Thus, in such an embodiment, the user is provided the added feature of a stereoscopic seamless view of the environment.

Multiple Users

As described above, the present invention allows multiple users to simultaneously navigate through the array independently of each other. To accommodate multiple users, the systems described above distinguish between inputs from the multiple users and selects a separate camera output appropriate to each user's inputs. In one such embodiment, the server tracks the current camera node address associated with each user by storing each node address in a particular memory location associate with that user. Similarly, each user's input is differentiated and identified as being associated with the particular memory location with the use of message tags appended to the user inputs by the corresponding user interface device.

In an alternate embodiment, two or more users may choose to be linked, thereby moving in tandem and having the same view of the environment. In such an embodiment, each includes identifying another user by his/her code to serve as a "guide". In operation, the server provides the outputs and views selected by the guide user to both the guide and the other user selecting the guide. Another user input causes the server to unlink the users, thereby allowing each user to control his/her own movement through the array.

Embodiments Covered

Although the present invention has been described in terms of certain preferred embodiments, other embodiments that are apparent to those of ordinary skill in the art are also intended to be within the scope of this invention. Accordingly, the scope of the present invention is intended to be limited only by the claims appended hereto.

What is claimed is:

1. A telepresence system for allowing a first user, in response to at least one first input, to navigate along a first path through an environment and a second user, in response to at least one second input, to navigate along a second path through the environment independently of the first user, the system comprising:

an array of cameras including a first series of cameras defining the first path through the environment, wherein the cameras in the first series have progressively different perspectives of the environment along the first path, and a second series of cameras defining the second path through the environment, wherein the cameras in the second series have progressively different perspectives of the environment along the second path;

at least one processing element coupled to the array, the processing element configured to select outputs of cameras in the first series, based on the first inputs, and to cause the selected outputs of cameras in the first series to be sequentially provided to the first user, thereby allowing the first user to progressively navigate through the environment along the first path, the at least one processing element also configured to select outputs of cameras in the second series, based on the second inputs, and to cause the selected outputs of cameras in the second series to be sequentially provided to the second user, thereby allowing the first user and second user to navigate simultaneously and independently through the environment along paths defined by cameras.

2. The system of claim 1 further including:

a first display device and first user interface device associated with the first user and coupled to the processing element; and a second display device and second user interface device associated with the second user and coupled to the processing element, wherein the processing element is further configured to select a first output based on first inputs received from interface device and send output to display device, the first display device configured to display the selected first output, and select a second output based on second inputs received from the second interface device and send the second output to the second display device, the second display device configured to display the selected second output.

3. The system of claim 2 wherein the processing element is configured to select outputs in real time and the display devices are configure to display views in real time.

4. The system of claim 2 wherein the first user interface device and the first display device are coupled to the processing element by different types of communication links.

5. The system of claim 1 wherein the array includes a plurality of navigable camera paths and the first path is different than the second path.

6. The system of claim 1 wherein the processing element includes a control processing element and a plurality of mixing processing elements.

7. The system of claim 1 wherein the processing element is also coupled to the array.

8. The system of claim 1 wherein the processing element includes a plurality of processing elements.

9. The system of claim 1 wherein the user interface device is coupled to the processing element by one of the following communication links: an internet link, a microwave link, a satellite link, a wireless link, or a fiber optics link.

10. The system of claim 1 wherein the first user interface device and second user interface device are coupled to the processing element by different communication links.

11. The system of claim 1 wherein the first user interface device and second user interface device are different types of devices.

12. The system of claim 1 wherein the array of cameras includes a plurality of modular rails having a male end and a female end, the male end of one rail connectable to the female end of another rail, and a plurality of cameras connectable to each rail.

13. The system of claim 1 wherein the array of cameras includes hollow ball joints, each of which houses a camera, and hollow rods interconnecting the ball joints, the rods housing communication paths for the outputs.

14. The system of claim 1 wherein the cameras in the array are positioned at a density of approximately one camera every inch.

15. The system of claim 1 wherein each camera in the first series has a view of the environment that overlaps the view of an adjacent camera in the first series.

16. The system of claim 1 wherein the first series of cameras includes a first camera having a first output and a second camera having a second output, the first and second cameras being adjacent one another, and wherein the processing element is further configured to mix the first and second outputs in accordance with the first input.

17. The system of claim 16 wherein the first inputs indicate a desire to move from the first camera to the second camera, and the processing element is configured to mix the first and second outputs by electronically switching between the first and second outputs at a switching speed.

18. The system of claim 17 wherein the processing element is further configured to mix the outputs by adjusting the switching speed.

19. The system of claim 16 wherein the first user inputs include an indication of relative speed of movement through the series of cameras and the processing element is configured to mix the first output and second output by switching from the first output to the second output at a switching speed, the processing element further configured to adjust the switching speed in accordance with the indication of relative speed.

20. The system of claim 16 wherein the first camera and record camera each have an associated view of the environment and the processing element is further configured to mix the outputs by dissolving the view associated with the first camera with the view of the second camera.

21. The system of claim 16 further comprising a first user display device associated with the first user and coupled to the processing element and wherein the first display device has a frame refresh rate associated therewith and the processing element is configured to mix the outputs by adjusting the frame refresh rate.

22. The system of claim 16 wherein the processing element is configured to mix the outputs by creating a composite output from the first and second outputs.

23. The system of claim 16 wherein the first series of cameras further includes a third camera adjacent the second camera and wherein the processor is configured to mix, in response to first inputs associated with moving along the first path from the first camera to the third camera, the outputs of the first camera and the second camera, and then mix the outputs of the second camera and the third camera.

24. The system of claim 16 wherein the processing element is configured to mix outputs by adding motion blur.

25. The system of claim 1 wherein the first inputs include an indication of a speed of movement through the first path series of cameras.

26. The system of claim 25 wherein the processing element is further configured to compare the indication of speed to a predetermined threshold and to select a number of outputs corresponding to fewer than all cameras in the series upon determining the indication of speed exceeds the predetermined threshold.

27. The system of claim 25 wherein the number of outputs is inversely proportional to the speed.

28. The system of claim 25 wherein the indication of relative speed of movement through the array includes an indication of moving relatively slower through the array and the processing element adjusts the switching speed by causing the view associated with the first camera to be displayed for a relatively longer period of time in accordance with the indication of moving slower.

29. The system of claim 1 wherein the user interface device includes a keyboard, wherein user inputs are keystrokes.

30. The system of claim 1 wherein the user interface device includes a joystick wherein user inputs are movements of the joystick.

31. The system of claim 1 wherein the user interface device includes a mouse, wherein user inputs are movements of the mouse.

32. The system of claim 1 wherein the user interface device includes a touchscreen.

33. The system of claim 1 wherein the user interface device includes a biofeedback device.

34. The system of claim 1 wherein the user interface device includes a voice recognition device.

35. The system of claim 34 wherein the user inputs further include moving forward and backward.

36. The system of claim 1 wherein the user inputs include an indication of a particular camera in the array.

37. The system of claim 1 wherein the user inputs include moving up, down, to the right, and to the left.

38. The system of claim 1 wherein the processing element operates in accordance with a navigation control algorithm, the navigation control algorithm distinguishing between permissible movement and impermissible movement in the array.

39. The system of claim 38 further including navigation control factors, wherein the navigation control algorithm controls movement through the array in accordance with the navigation control factors.

40. The system of claim 39 wherein the navigation control factors include one of the group of factors consisting of: time of day, time duration, speed of navigation through the array, output of a device in the array, output of a motion sensor, and output of a microphone.

41. The system of claim 1 wherein the processing element is further configured to disregard a certain one or more of the fist imprints or the second imprints.

42. The system of claim 41 wherein the processing element is further configured to disregard the certain input by selecting at least one predetermined camera output, thereby directing the user to a predetermined view of the environment.

43. The system of claim 42 wherein the processing element is configured to select the predetermined output based on time of day.

44. The system of claim 42 wherein the processing element is configured to select the predetermined output based on a duration of time.

45. The system of claim 41 wherein the processing element is further configured to disregard the certain input by waiting for a permissible input.

46. The system of claim 41 further including an operator input device coupled to the processing element for receiving from the operator input device an operator input, and wherein the processing element is controlled to disregard the certain input based on the operator input.

47. The system of claim 1 wherein the system further includes a memory storing additional source output, wherein the first inputs include an indication of viewing the additional source output, and the processing element is further configured to mix camera output and the additional source output upon receiving the indication to view the additional source output.

48. The system of claim 47 wherein the indication of viewing the additional source output is available to the first user in connection with at least one predetermined camera.

49. The system of claim 47 wherein the processing element is configured to mix camera output and the additional source output by compositing camera output and the additional source output.

50. The system of claim 47 wherein the processing element is configured to mix camera output and the additional source output by switching from camera output to the additional source output.

51. The system of claim 47 wherein the additional source output includes output from the group of outputs consisting of: computer graphic imagery, virtual world imagery, applets, film clips, and animation.

52. The system of claim 1 further including a plurality of microphones, each microphone having an output, wherein the processing element is further configured to select a microphone output based on the first input for transmission to the first user.

53. The system of claim 52 further including a memory coupled to the processing element, the memory correlating cameras and microphones, the processing element selecting a microphone by using the memory to correlate the selected camera output with a microphone output.

54. A method of providing users with views of a remote environment, the method comprising:
   receiving electronic images of the environment captured from an array of cameras, the array including at least a first series of cameras defining a first path through the environment, the first series of cameras having progressively different perspectives of the environment along the first path;
   receiving a first input from a first user interface device associated with a first user, the first input indicating movement through the environment along the first path;
   providing to the first user images from the first series of cameras in sequence along the first path, thereby simulating movement by the first user through the environment along the first path.

55. The method of claim 54 wherein the receiving images including receiving images from a second series of cameras in the array, the second series defining a second path through the environment, the second series of cameras having progressively different perspectives on the environment along the second path and wherein the method further includes:
   receiving a second input from a second user interface device associated with a second user, the second input indicating movement through the environment along the second path;
   providing to the second user images from the second series of cameras in sequence along the second path, thereby simulating movement by the second user through the environment along the second path, independently of simulating movement by the first user through the environment.

56. The method of claim 55 wherein the first path differs from the second path.

57. The method of claim 54 wherein the providing of the images to the first user includes obtaining a first mixed image by mixing the image from a first camera in the first series with the image from a second camera in the first series and providing the first mixed image to the first user.

58. The method of claim 57 wherein mixing the first image with the second image includes compositing the first image with the second image.

59. The method of claim 58 wherein mixing the third image with the fourth image includes switching between the third image and the fourth image.

60. The method of claim 57 wherein mixing the first image with the second image includes dissolving the first image into the second image.

61. The method of claim 57 wherein the first image is from a first camera, the second image is from a second camera, the array includes another camera interposed between the first and second cameras, and mixing the first image with the second image includes providing the first user with an image from the interposed camera.

62. The method of claim 57 further including receiving a third input from the first user interface device and overriding the third input.

63. The method of claim 62 wherein overriding the received third input includes presenting the first user with a predetermined image.

64. The method of claim 62 wherein overriding the received third input includes continuing to provide the first user with the first mixed image and awaiting a fourth input.

65. The method of claim 57 wherein receiving the first input includes receiving an indication of mixing an additional source output, the method further including obtaining a third mixed output by mixing the second image with the additional source output.

66. The method of claim 65 wherein mixing the second image with the additional source output includes switching from the second image to the additional source output.

67. The method of claim 54 wherein mixing the first image with the second image includes switching from the first image to the second image at a first switching speed, the first mixed image including the second image, and mixing the third image with the fourth image includes switching from the third image to the fourth image at a second switching speed, the second mixed image including the fourth image.

68. The method of claim 67 wherein receiving the first input includes receiving an indication of a first speed of movement along the first path and wherein the first switching speed is based on the indication of the first speed of movement.

69. The method of claim 68 wherein receiving the second input includes receiving an indication of a second speed of movement along the second path, the second speed greater than the first speed, and wherein the second switching speed is based on the indication of the second speed of movement, the second switching speed greater than the first switching speed.

70. The method of claim 69 wherein mixing the third and fourth images involves providing the second user the third image for a relatively longer duration than the first image is provided to the first user.

71. The method of claim 69 wherein mixing the third and fourth images involves providing the second user the fourth image for a relatively longer duration than the second image is provided to the first user.

72. The method of claim 69 further including obtaining a third mixed image by mixing the second image with a fifth image, the fifth image from a camera in the first series, in accordance with the first input and providing the first user the third mixed image.

73. A device for providing a user with a display of an environment, the device comprising:
   an array of cameras, each camera having an associated view of the environment and an associated camera output representing the associated view; and
   at least one processing element coupled to the array, the processing element configured to identify permissible cameras, the outputs of which may be provided to the user, and impermissible cameras, the outputs of which are not provided to the user, despite receiving a request from the user to receive the output of an impermissible camera.

74. The device of claim 73 wherein the output of a certain impermissible camera is not provided to the user despite a request from the user to receive the output of the certain impermissible camera.

75. The device of claim 74 wherein the permissible cameras change based on the time of day.

76. The device of claim 73 wherein the environment being viewed is a performance and the permissible cameras change based on the duration of time from the start of the performance.

77. The device of claim 73 wherein the permissible cameras are predetermined.

78. The device of claim 77 further including memory coupled to the processing element, the memory storing an indication of the predetermined permissible cameras.

79. The device of claim 73 further including a user interface device associated with the user and coupled to the processing element, the user interface device providing user inputs to the processing element indicative of movement through the array, the processing element selecting permissible camera output based on the user input.

80. The device of claim 79 wherein the processing element is configured to disregard user input corresponding to a impermissible camera.

81. The device of claim 80 wherein the processing element is configured to disregard user input corresponding to a impermissible camera by awaiting new user input corresponding to a permissible camera.

82. The device of claim 80 wherein the processing element is configured to disregard user input corresponding to a impermissible camera by selecting a permissible camera output.

83. The device of claim 73 further including a data device other than a camera having an output coupled to the at least one processing element, the permissible cameras based on the data device output.

84. The device of claim 83 wherein the data device is a motion sensor.

85. The device of claim 83 wherein the data device is a microphone.

86. A method for providing a user with views of an environment from a plurality of cameras in accordance with user inputs, the method comprising:
    electronically receiving user inputs indicative of a view from a camera;
    identifying permissible cameras, the views from which are capable of being provided to the user; and
    determining whether the camera is one of the permissible cameras; and
    if the camera is not one of the permissible cameras, preventing the user from obtaining the view from the camera, wherein the permissible cameras change over time.

87. The method of claim 86 wherein the permissible cameras change while the user views the environment.

88. The method of claim 86 wherein identifying permissible cameras is based on time of day.

89. The method of claim 86 further including noting when the user begins to view the environment and wherein the permissible cameras are based on a period of time from when the user begins to view the environment.

90. The method of claim 86 wherein the environment is a performance and the permissible cameras are based on the performance.

91. A device for providing a user with a display of an environment in response to user inputs, the system comprising:
    an array of cameras including one or more series of cameras in one or more paths, each camera in a series has a progressively different associated view of the environment along a path and an associated camera output representing the associated view;
    memory storing an additional source output, the additional source output including other than the output of the array of cameras; and
    at least one processing element coupled to the memory for receiving the additional source output, the processing element configured to interpret user inputs and select, based on the user inputs, a sequence of outputs of cameras in a path, or the additional source output to provide to the user.

92. The device of claim 91 wherein the processing element is configured to mix the additional source output with camera output.

93. The device of claim 92 wherein the processing element is configured to mix the additional source output and camera output by switching from the camera output to the additional source output.

94. The system of claim 91 further including a plurality of user interface devices coupled to the processing element, each associated with a different user and having user inputs associated with movement among cameras in the array.

95. The system of claim 91 wherein the array of cameras includes a plurality of modular rails having a male end and a female end, the male end of one rail connectable to the female end of another rail, and a plurality of cameras connectable to each rail.

96. The system of claim 91 wherein the array includes at least one user navigable path of cameras and the user inputs include an indication of a speed of movement through the path.

97. The system of claim 91 wherein the processing element is further configured to override user inputs and select at least one predetermined camera output, thereby directing the user to a predetermined view.

98. The system of claim 97 wherein the processing element is configured to select the predetermined output based on a navigation control factor.

99. A method of providing a user with a view of an environment, the method comprising:
    receiving electronic images of the environment from an array of cameras, the array including one or more series of cameras in one or more paths, each camera in a series having a progressively different associated view of the environment along a path;
    receiving via a telecommunication link user inputs indicative of movement through the array;
    selecting a sequence of camera images in a path based on the user inputs;
    retrieving additional source output from memory based on user input indicating a desire to view the additional source output, the additional source output including other than output of the array of cameras; and
    providing the user with the additional source output at one or more points in the array.

100. A system for remote seamless viewing of an environment from an array of cameras, each having an output representing an image of the environment, the system comprising:
    an interface device having inputs for selecting a path through at least a portion of the array from which to view the environment, the path including a sequence of cameras, each camera in the sequence having a different point perspective and a field of view that overlaps that of an adjacent camera; and a display device for sequentially displaying at least a portion of the images selected by the processing element, thereby providing the user a substantially seamless view of the environment along the path.

101. The system of claim 100 wherein the images from the selected cameras are displayed at a rate of approximately twenty-four images per second.

102. The system of claim 100 wherein the user interface device includes at least one of the following devices: a keyboard; a joystick; a mouse; a touchscreen; a biofeedback device; and a voice recognition device.

103. The system of claim 100 wherein the images displayed by the display device are mixed.

104. The system of claim 103 wherein the images displayed are mixed by continuously switching from the image of a current camera in the path to the image of a next camera in the path.

105. The system of claim 104 wherein the inputs are for selecting a speed of progressing through the path and the images are switched in accordance with the selected speed.

106. The system of claim 103 wherein the images displayed are mixed by continuously compositing the image from a current camera in the sequence with the image of a next camera in the array.

107. The system of claim 100 wherein the inputs are for selecting a speed of progressing through the path.

108. The system of claim 100 wherein the display device displays a plurality of images stereoscopically.

109. A method for a user experiencing movement through an environment along a path of cameras in an array, the cameras having progressively different point perspectives of the environment, the method comprising:

receiving electronically a first image captured from the array of cameras, the first image having a first field of view from a first point perspective;

receiving electronically a second image captured from the array, the second image having a second field of view from a second point perspective, the second field of view overlapping the first field of view;

receiving electronically a third image captured from the array, the third image having a third field of view from a third point perspective, the third field of view overlapping that overlaps the second field of view, wherein the first, second and third point perspectives are on the path;

displaying the first, second, and third images in sequence to the user, thereby obtaining an experience of seamless movement through the environment along the path.

110. The method of claim 109 wherein the displaying includes switching from the first image to the second image to the third image at a given speed.

111. The method of claim 110 further including selecting a speed of movement through the array, wherein the given speed is based on the selected speed.

112. The method of claim 109 wherein the displaying includes applying a given frame refresh rate to the images.

113. The method of claim 109 wherein the displaying includes compositing the first image with the second image and then compositing the second image with the third image.

114. The method of claim 109 wherein the displaying includes dissolving the first image into the second image and then dissolving the second image into the third image.

115. The method of claim 109 further including selecting an additional source output to be displayed and mixing the additional source output with the third image.

116. The method of claim 109 wherein the first, second and third images correspond to first, second, and third cameras, respectively.

117. The method of claim 116 wherein the second camera is adjacent to the first and third cameras.

118. The method of claim 109 wherein at least one of the images is a stereoscopic image obtained from a plurality of cameras in the array.

119. A telepresence system for providing multiple users with simulated independent movement through an environment, the system comprising:

an array of cameras including a series of cameras, each camera in the series having an associated view of the environment from a progressively different point perspective and an associated camera output representing the associated view;

an electronic storage device for sharing outputs among multiple users; and at least one processing element coupled to the electronic storage device, the processing element configured to electronically store outputs from cameras in the series and an indication of which camera each output is associated with on the electronic storage device, thereby allowing subsequent simultaneous retrieval of the stored outputs by multiple users; and the processing element also configured to sequentially retrieve for multiple users from the electronic storage device.stored outputs from cameras in the series, thereby simulating progressive movement along the different point perspectives of the views associated with the retrieved outputs.

* * * * *